United States Patent
Cho et al.

(10) Patent No.: US 12,081,292 B2
(45) Date of Patent: Sep. 3, 2024

(54) ELECTRONIC DEVICE INCLUDING ANTENNA AND OPERATING METHOD THEREOF

(71) Applicant: Samsung Electronics Co., Ltd., Suwon-si (KR)

(72) Inventors: Woosik Cho, Suwon-si (KR); Kyubin Kang, Suwon-si (KR); Seunggil Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 17/863,973

(22) Filed: Jul. 13, 2022

(65) Prior Publication Data

US 2023/0029175 A1    Jan. 26, 2023

Related U.S. Application Data

(63) Continuation of application No. PCT/KR2022/009616, filed on Jul. 4, 2022.

(30) Foreign Application Priority Data

Jul. 19, 2021  (KR) .................. 10-2021-0094352

(51) Int. Cl.
*H04B 7/0426*    (2017.01)
*H01Q 1/24*    (2006.01)
(Continued)

(52) U.S. Cl.
CPC ............. *H04B 7/043* (2013.01); *H01Q 1/241* (2013.01); *H04B 7/0602* (2013.01); *H04M 1/021* (2013.01)

(58) Field of Classification Search
CPC ...... H04B 7/043; H04B 7/0602; H01Q 1/241; H04M 1/021
See application file for complete search history.

(56) References Cited

U.S. PATENT DOCUMENTS

| 7,400,296 B2 | 7/2008 | Haskell | |
| 7,983,626 B2 * | 7/2011 | Kim .................. | H04B 1/18 455/193.1 |

(Continued)

FOREIGN PATENT DOCUMENTS

| CN | 112993545 A | 6/2021 |
| KR | 10-1130142 B1 | 3/2012 |

(Continued)

OTHER PUBLICATIONS

International Search Report dated Oct. 13, 2022, issued in International Patent Application No. PCT /KR2022/009616.

*Primary Examiner* — David B Lugo
(74) *Attorney, Agent, or Firm* — Jefferson IP Law, LLP

(57) ABSTRACT

An electronic device is provided. The electronic device includes a hinge module, a first housing at least partially coupled to a first side of the hinge module and including a first antenna, a second housing at least partially coupled to a second side of the hinge module, configured to be foldable and unfoldable with the first housing by using the hinge module, and including a second antenna, a sensor circuit configured to detect an unfolding state and/or a folding state of the first housing and the second housing, a processor operatively connected to the first antenna, the second antenna, and the sensor circuit, a first signal line configured to connect the processor and the first antenna, a tuner circuit disposed on the first signal line, and a second signal line configured to connect the processor and the second antenna, wherein the processor is configured to, in case that the first housing and the second housing are detected to be in the folding state by using the sensor circuit, receive feedback of a signal transmitted to the second antenna, detect a phase of the feedback signal, and determine a time constant of the (Continued)

tuner circuit disposed on the first signal line, based on the detected phase of the signal.

17 Claims, 16 Drawing Sheets

(51) Int. Cl.
*H04B 7/06* (2006.01)
*H04M 1/02* (2006.01)

(56) References Cited

U.S. PATENT DOCUMENTS

| | | | |
|---|---|---|---|
| 10,931,323 B2 | 2/2021 | Lee et al. | |
| 11,075,469 B2 | 7/2021 | Huh et al. | |
| 11,201,635 B2 | 12/2021 | Chu et al. | |
| 2007/0118335 A1* | 5/2007 | Andarawis | G01M 5/0066 |
| | | | 702/188 |
| 2014/0022132 A1* | 1/2014 | Badaruzzaman | H01Q 9/0421 |
| | | | 343/745 |
| 2019/0334565 A1 | 10/2019 | Itkin | |
| 2020/0333855 A1 | 10/2020 | Kim et al. | |
| 2020/0350939 A1* | 11/2020 | Lee | G06F 1/1637 |
| 2022/0109498 A1* | 4/2022 | Vaez-Ghaemi | G02B 6/4284 |
| 2022/0115768 A1 | 4/2022 | Oh et al. | |
| 2022/0291338 A1* | 9/2022 | Hur | G01S 7/35 |
| 2022/0416404 A1* | 12/2022 | Harper | H01Q 1/241 |

FOREIGN PATENT DOCUMENTS

| | | |
|---|---|---|
| KR | 10-2020-0031607 A | 3/2020 |
| KR | 10-2020-0049391 A | 5/2020 |
| KR | 10-2020-0074411 A | 6/2020 |
| KR | 10-2020-0100986 A | 8/2020 |
| KR | 10-2020-0121518 A | 10/2020 |

* cited by examiner

[610]

[650]

ELECTRONIC DEVICE INCLUDING ANTENNA AND OPERATING METHOD THEREOF

CROSS-REFERENCE TO RELATED APPLICATION(S)

This application is a continuation application, claiming priority under § 365(c), of an International application No. PCT/KR2022/009616, filed on Jul. 4, 2022, which is based on and claims the benefit of a Korean patent application number 10-2021-0094352, filed on Jul. 19, 2021, in the Korean Intellectual Property Office, the disclosure of which is incorporated by reference herein in its entirety.

TECHNICAL FIELD

The disclosure relates to an electronic device including an antenna and a method for operating the same.

BACKGROUND ART

Electronic devices have been gradually slimmer, and have been improved both to enhance design aspects thereof and to differentiate functional elements thereof. Electronic devices have been evolving from unilateral shapes (rectangular types) into more diversified shapes. For example, an electronic device may have a deformable structure such that the display size can be adjusted in order to satisfy portability and usability of the electronic device. An electronic device having a deformable structure may include a foldable electronic device having at least two housings, for example, a first housing and a second housing, which operate so as to fold or unfold with regard to each other. In the unfolded state of the foldable electronic device, a large-area display is available, and in the folded state, the overall volume of the electronic device is reduced, thereby improving both usability and portability.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The first and second housings may be at least partially made of a conductive material, and at least a part of the conductive portion of the first and second housings may be separated by at least one segment portion and used as antennas (e.g., first and second antennas) for performing wireless communication. In the folded state of the electronic device, a fixed time constant for phase delay may be used to reduce the phase difference between the first and second antennas. However, using a fixed time constant may generate a phase deviation between the first and second antennas. Furthermore, in the folded state of the electronic device, a difference (for example, imbalance) in performance between the first and second antennas may degrade the radiation performance of the first and second antennas.

Aspects of the disclosure are to address at least the above-mentioned problems and/or disadvantages and to provide at least the advantages described below. Accordingly, an aspect of the disclosure is to provide an electronic device for deleting the fixed time constant disposed on the path of the first antenna, and having a variable tuner circuit disposed thereon. The electronic device may receive phase information of the second antenna and may then configure the time constant of the tuner circuit disposed on the first antenna path corresponding to the phase of the second antenna.

Another aspect of the disclosure is to provide an electronic device for applying different power backoffs to first and second antennas in the case of a performance imbalance between the first and second antennas.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a hinge module, a first housing at least partially coupled to a first side of the hinge module and including a first antenna, a second housing at least partially coupled to a second side of the hinge module, configured to be foldable and unfoldable with the first housing by using the hinge module, and including a second antenna, a sensor circuit configured to detect an unfolding state and/or a folding state of the first housing and the second housing, a processor operatively connected to the first antenna, the second antenna, and the sensor circuit, a first signal line configured to connect the processor and the first antenna, a tuner circuit disposed on the first signal line, and a second signal line configured to connect the processor and the second antenna, wherein the processor is configured to, in case that the first housing and the second housing are detected to be in the folding state by using the sensor circuit, receive feedback of a signal transmitted to the second antenna, detect a phase of the feedback signal, and determine a time constant of the tuner circuit disposed on the first signal line, based on the detected phase of the signal.

In accordance with another aspect of the disclosure, an operating method of an electronic device including an antenna is provided. The operating method includes, in case that a first housing and a second housing of the electronic device are detected to be in a folding state by using a sensor circuit, receiving feedback of a phase of a signal transmitted to a second antenna, detecting the feedback phase of the signal, and determining a time constant of a tuner circuit disposed on a first signal line connecting a first antenna and a processor of the electronic device, based on the detected phase of the signal.

Advantageous Effects of Invention

An electronic device according to various embodiments of the disclosure supports variable configuration of a time constant of a tuner circuit disposed on a first antenna path corresponding to the phase of a second antenna in a folded state of the electronic device such that not only the phase deviation between the first and second antennas can be reduced, but also the performance of the first and second antennas can be improved.

An electronic device according to various embodiments of the disclosure supports application of different power backoffs to first and second antennas such that identical power is supplied to the first and second antennas in the case of a performance imbalance between the first and second antennas in a folded state of the electronic device such that not only the radiation performance of the first and second antennas can be secured, but also power decrease can be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
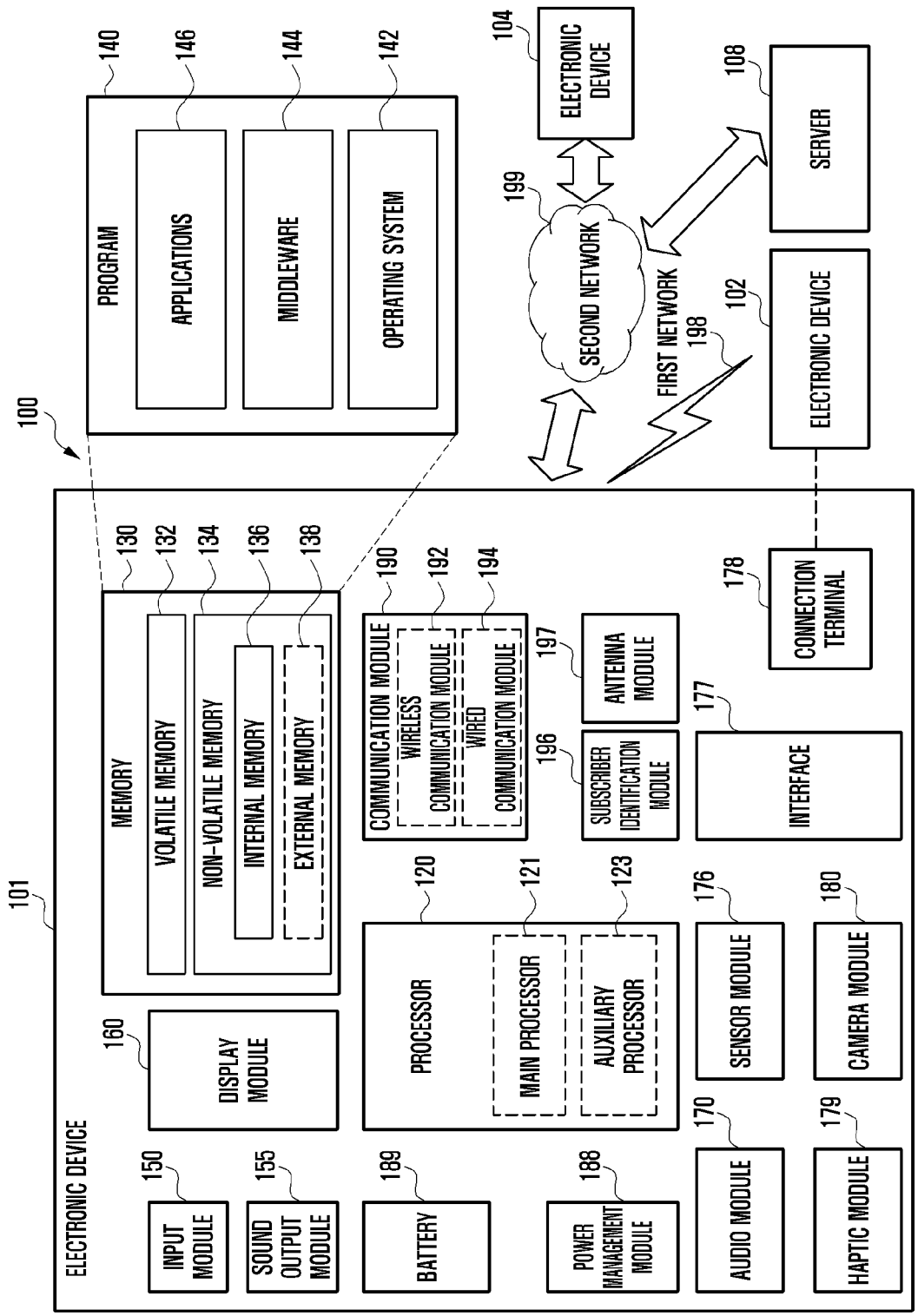
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
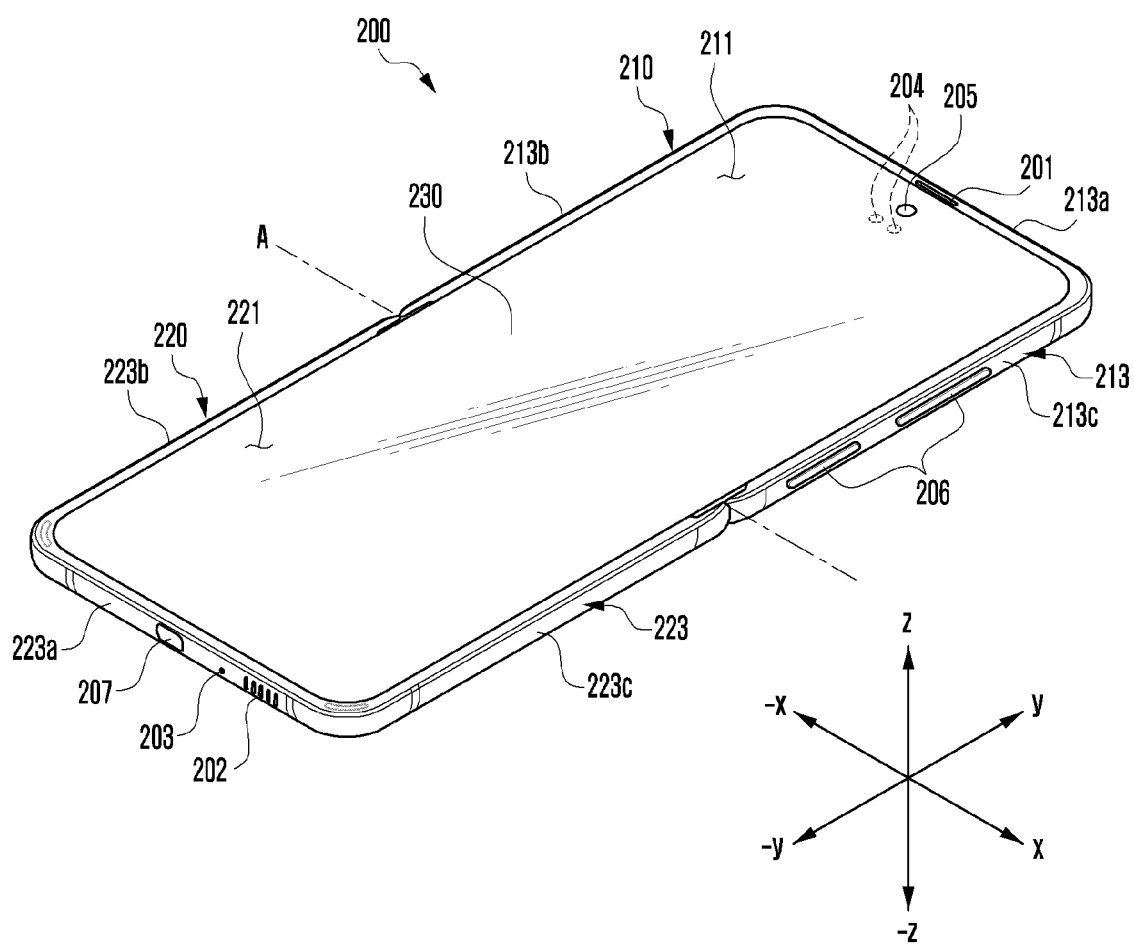
FIG. 2A is a perspective view of an electronic device illustrating a flat state or an unfolding state according to an embodiment of the disclosure.

FIG. 2A is a front perspective view of an electronic device in a flat or unfolded state according to an embodiment of the disclosure.

Figure 2B:
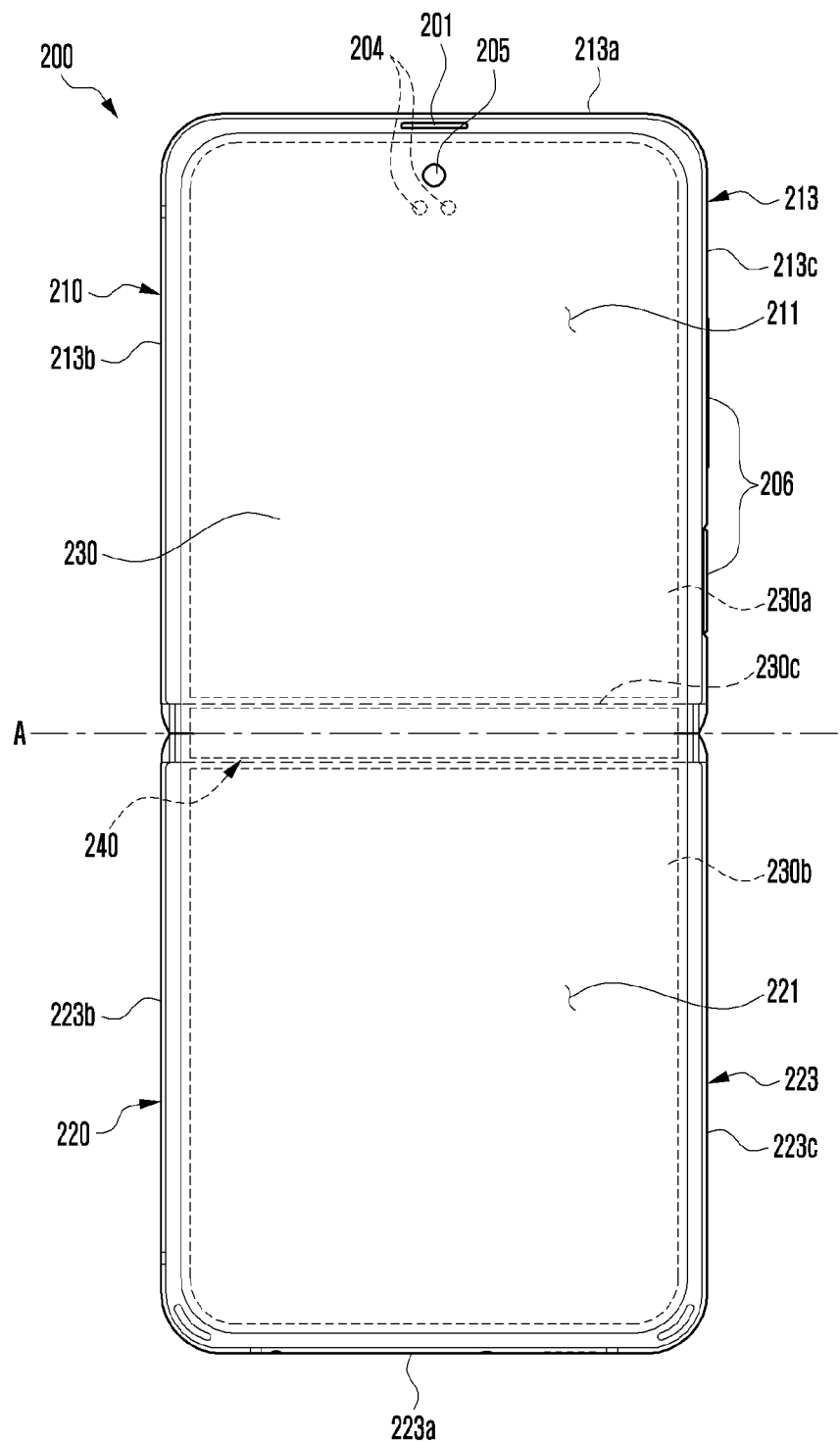
FIG. 2B is a plan view illustrating a front of an electronic device in an unfolded state according to an embodiment of the disclosure.

FIG. 2B is a plan view illustrating the front of an electronic device in an unfolded state according to an embodiment of the disclosure.

Figure 2C:
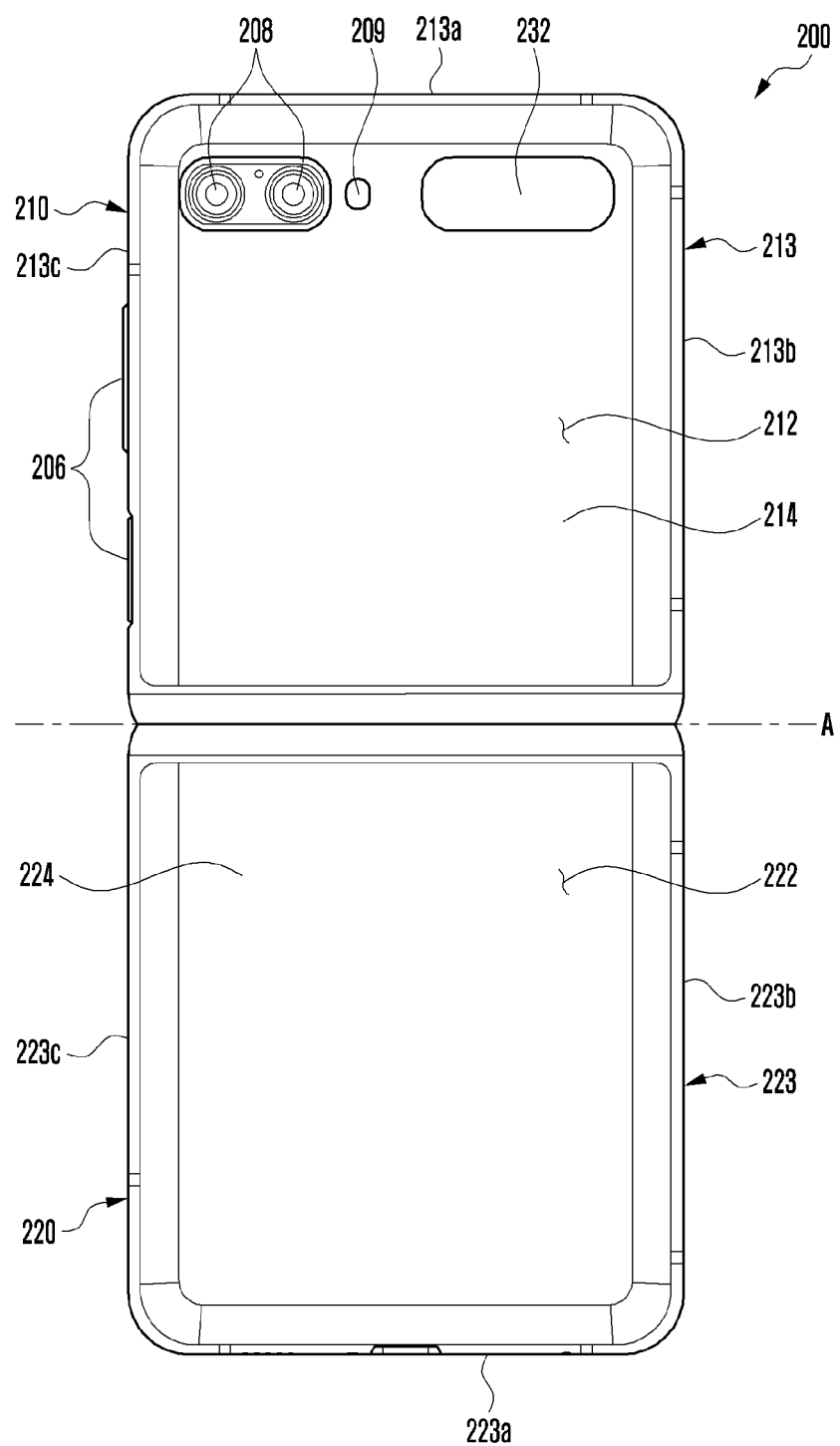
FIG. 2C is a plan view illustrating a back of an electronic device in an unfolded state according to an embodiment of the disclosure.

FIG. 2C is a plan view illustrating the back of an electronic device in an unfolded state according to an embodiment of the disclosure.

Figure 3A:
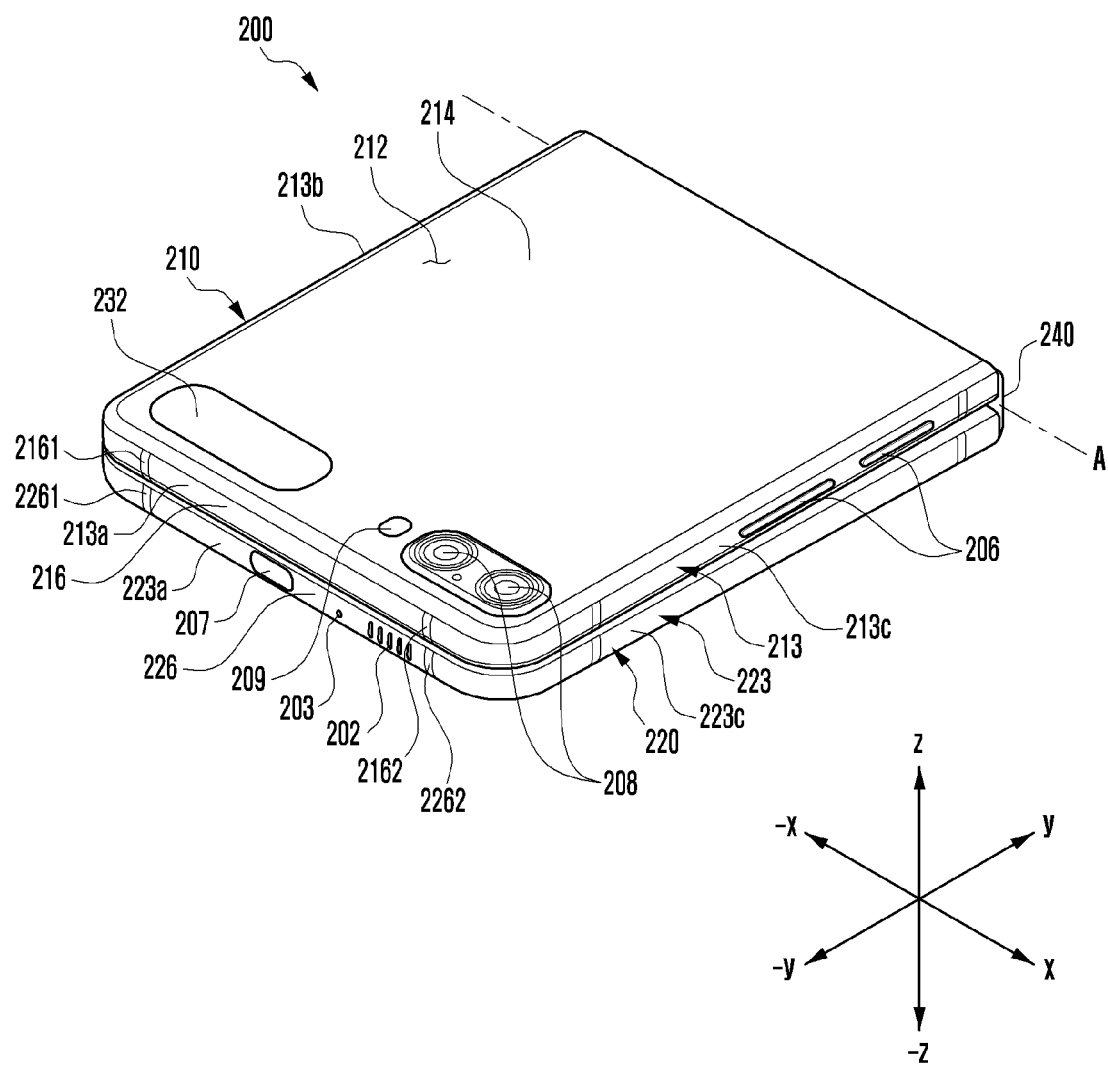
FIG. 3A is a perspective view of an electronic device in a folded state according to an embodiment of the disclosure.

FIG. 3A is a perspective view of an electronic device in a folded state according to an embodiment of the disclosure.

Figure 3B:
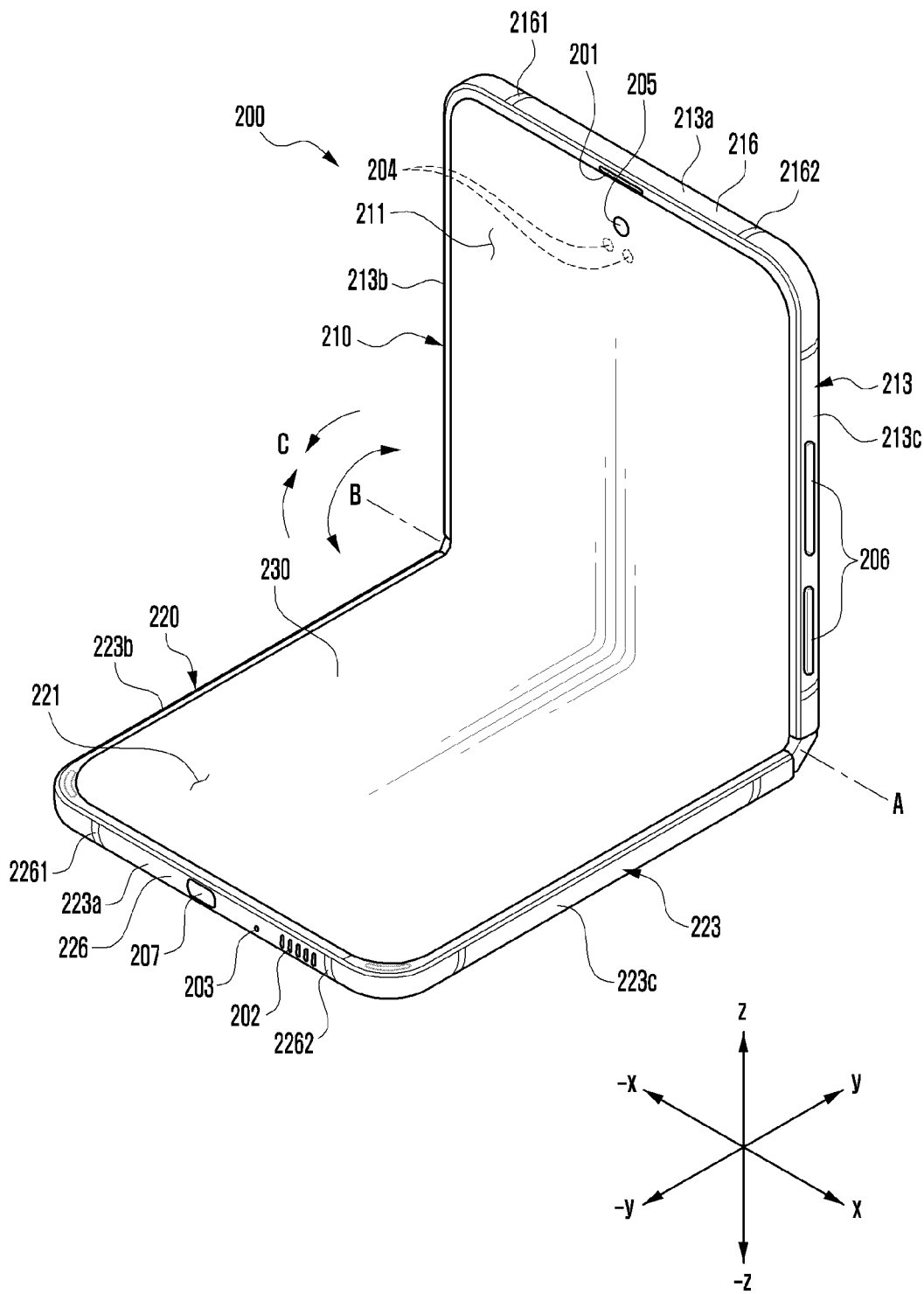
FIG. 3B is a perspective view of an electronic device in an intermediate state according to an embodiment of the disclosure.

FIG. 3B is a perspective view of an electronic device in an intermediate state according to an embodiment of the disclosure.

Referring to FIGS. 2A, 2B, 2C, 3A, and 3B, the electronic device 200 may include a pair of housings 210 and 220 (e.g., foldable housings) that are rotatably coupled as to allow folding relative to a hinge mechanism (e.g., hinge mechanism 240 in FIG. 2B). In certain embodiments, the hinge mechanism (e.g., hinge mechanism 240 in FIG. 2B) may be disposed in the X-axis direction or in the Y-axis direction. In certain embodiments, two or more hinge mechanisms (e.g., hinge mechanism 240 in FIG. 2B) may be arranged to be folded in a same direction or in different directions. According to an embodiment, the electronic device 200 may include a flexible display 230 (e.g., foldable display) disposed in an area formed by the pair of housings 210 and 220. According to an embodiment, the first housing 210 and the second housing 220 may be disposed on both sides about the folding axis (axis A), and may have a substantially symmetrical shape with respect to the folding axis (axis A). According to an embodiment, the angle or distance between the first housing 210 and the second housing 220 may vary, depending on whether the state of the electronic device 200 is a flat or unfolded state, a folded state, or an intermediate state.

According to certain embodiments, the pair of housings 210 and 220 may include a first housing 210 (e.g., first housing structure) coupled to the hinge mechanism (e.g., hinge mechanism 240 in FIG. 2B), and a second housing 220 (e.g., second housing structure) coupled to the hinge mechanism (e.g., hinge mechanism 240 in FIG. 2B). According to an embodiment, in the unfolded state, the first housing 210 may include a first surface 211 facing a first direction (e.g., front direction) (z-axis direction), and a second surface 212 facing a second direction (e.g., rear direction) (negative z-axis direction) opposite to the first surface 211. According to an embodiment, in the unfolded state, the second housing 220 may include a third surface 221 facing the first direction (z-axis direction), and a fourth surface 222 facing the second direction (negative z-axis direction). According to an embodiment, the electronic device 200 may be operated in such a manner that the first surface 211 of the first housing 210 and the third surface 221 of the second housing 220 face substantially the same first direction (z-axis direction) in the unfolded state, and the first surface 211 and the third surface 221 face one another in the folded state. According to an embodiment, the electronic device 200 may be operated in such a manner that the second surface 212 of the first housing 210 and the fourth surface 222 of the second housing 220 face substantially the same second direction (negative z-axis direction) in the unfolded state, and the second surface 212 and the fourth surface 222 face one another in opposite directions in the folded state. For example, in the folded state, the second surface 212 may face the first direction (z-axis direction), and the fourth surface 222 may face the second direction (negative z-axis direction).

According to certain embodiments, the first housing 210 may include a first side member 213 that at least partially forms an external appearance of the electronic device 200, and a first rear cover 214 coupled to the first side member 213 that forms at least a portion of the second surface 212 of the electronic device 200. According to an embodiment, the first side member 213 may include a first side surface 213a, a second side surface 213b extending from one end of the first side surface 213a, and a third side surface 213c extending from the other end of the first side surface 213a. According to an embodiment, the first side member 213 may be formed in a rectangular shape (e.g., square or rectangle) through the first side surface 213a, second side surface 213b, and third side surface 213c.

According to certain embodiments, the second housing 220 may include a second side member 223 that at least partially forms the external appearance of the electronic device 200, and a second rear cover 224 coupled to the second side member 223, forming at least a portion of the fourth surface 222 of the electronic device 200. According to an embodiment, the second side member 223 may include a fourth side surface 223a, a fifth side surface 223b extending from one end of the fourth side surface 223a, and a sixth side surface 223c extending from the other end of the fourth side surface 123a. According to an embodiment, the second side member 223 may be formed in a rectangular shape through the fourth side surface 223a, fifth side surface 223b, and sixth side surface 223c.

According to certain embodiments, the pair of housings 210 and 220 are not limited to the shape and combinations illustrated herein, and may be implemented with a combination of other shapes or parts. For example, in certain embodiments, the first side member 213 may be integrally formed with the first rear cover 214, and the second side member 223 may be integrally formed with the second rear cover 224.

According to certain embodiments, in the unfolded state of the electronic device 200, the second side surface 213b of the first side member 213 and the fifth side surface 223b of the second side member 223 may be connected without a gap formed therebetween. According to an embodiment, in the unfolded state of the electronic device 200, the third side surface 213c of the first side member 213 and the sixth side surface 223c of the second side member 223 may be connected without a gap formed therebetween. According to an embodiment, in the unfolded state, the electronic device 200 may be configured such that the combined length of the second side surface 213b and the fifth side surface 223b is longer than the combined length of the first side surface 213a and/or the fourth side surface 223a. In addition, the combined length of the third side surface 213c and the sixth side surface 223c may be configured to be longer than the length of the first side surface 213a and/or the fourth side surface 223a.

According to certain embodiments, the first side member 213 and/or the second side member 223 may be formed of a metal, and may further include a polymer injected into the metal. According to an embodiment, the first side member 213 and/or the second side member 223 may include at least one first conductive portion 216 and/or the second conductive portion 226 electrically segmented through one or more segmenting portions 2161 and 2162 and/or segmenting portions 2261 and 2262, which may be formed using a polymer. In this case, the at least one conductive portion may be electrically connected to a wireless communication circuit included in the electronic device 200, and may be used as an antenna operating in at least one designated band (e.g., legacy band).

According to certain embodiments, the first rear cover 214 and/or the second rear cover 224 may be formed of, for example, coated or tinted glass, ceramic, polymer, metal (e.g., aluminum, stainless steel or "STS", or magnesium), or a combination thereof.

According to certain embodiments, the flexible display 230 may be disposed to extend from the first surface 211 of the first housing 210 across the hinge mechanism (e.g., hinge mechanism 240 in FIG. 2B) to at least a portion of the third surface 221 of the second housing 220. For example, the flexible display 230 may include a first region 230a substantially corresponding to the first surface 211, a second region 230b corresponding to the third surface 221, and a third region 230c (e.g., the bendable region) connecting the first region 230a and the second region 230b and corresponding to the hinge mechanism (e.g., hinge mechanism 240 in FIG. 2B). According to an embodiment, the electronic device 200 may include a first protection cover 215 (e.g., first protection frame or first decoration member) coupled along the periphery of the first housing 210. According to an embodiment, the electronic device 200 may include a second protection cover 225 (e.g., second protection frame or second decoration member) coupled along the periphery of the second housing 220. According to an embodiment, the first protection cover 215 and/or the second protection cover 225 may be formed of a metal or polymer material. According to an embodiment, the first protection cover 215 and/or the second protection cover 225 may be used as a decorative member. According to an embodiment, the flexible display 230 may be positioned such that the periphery of the first region 230a is interposed between the first housing 210 and the first protection cover 215. According to an embodiment, the flexible display 230 may be positioned such that the periphery of the second region 230b is interposed between the second housing 220 and the second protection cover 225. According to an embodiment, the flexible display 230 may be positioned such that the periphery of the flexible display 230 corresponding to a protection cap 235 is protected through the protection cap disposed in a region corresponding to the hinge mechanism (e.g., hinge mechanism 240 in FIG. 2B). Consequently, the periphery of the flexible display 230 may be substantially protected from the outside. According to an embodiment, the electronic device 200 may include a hinge housing 241 (e.g., hinge cover) that is disposed so as to support the hinge mechanism (e.g., hinge mechanism 240 in FIG. 2B). The hinge housing 241 may further be exposed to the outside when the electronic device 200 is in the folded state, and be invisible as viewed from the outside when retracted into a first space (e.g., internal space of the first housing 210) and a second space (e.g., internal space of the second housing 220) when the electronic device 200 is in the unfolded state. In certain embodiments, the flexible display 230 may be disposed to extend from at least a portion of the second surface 212 to at least a portion of the fourth surface 222. In this case, the electronic device 200 may be folded so that the flexible display 230 is exposed to the outside (out-folding scheme).

According to certain embodiments, the electronic device 200 may include a sub-display 232 disposed separately from the flexible display 230. According to an embodiment, the sub-display 232 may be disposed to be at least partially exposed on the second surface 212 of the first housing 210, and may display status information of the electronic device 200 in place of the display function of the flexible display 230 in case of the folded state. According to an embodiment, the sub-display 232 may be disposed to be visible from the outside through at least some region of the first rear cover 214. In certain embodiments, the sub-display 232 may be disposed on the fourth surface 222 of the second housing 220. In this case, the sub-display 232 may be disposed to be visible from the outside through at least some region of the second rear cover 224.

According to certain embodiments, the electronic device 200 may include at least one of an input device 203 (e.g., microphone), sound output devices 201 and 202, a sensor module 204, camera devices 205 and 208, a key input device 206, or a connector port 207. In the illustrated embodiment, the input device 203 (e.g., microphone), sound output devices 201 and 202, sensor module 204, camera devices 205 and 208, key input device 206, and connector port 207 indicate a hole or shape formed in the first housing 210 or the second housing 220, but may be defined to include a substantial electronic component (e.g., input device, sound output device, sensor module, or camera device) that is disposed inside the electronic device 200 and operated through a hole or a shape.

According to certain embodiments, the input device 203 may include at least one microphone disposed on the second housing 220. In certain embodiments, the input device 203 may include a plurality of microphones disposed to detect the direction of a sound. In certain embodiments, a plurality of microphones may be disposed at appropriate positions in the first housing 210 and/or the second housing 220. According to an embodiment, the sound output devices 201 and 202 may include speakers. According to an embodiment, the input device 203 may include a receiver for calls disposed in the first housing 210, and a speaker disposed in the second housing 220. In certain embodiments, the input device 203, the sound output devices 201 and 202, and the connector port 207 may be disposed in a space arranged in the first housing 210 and/or the second housing 220 of the electronic device 200, and may be exposed to the external environment through at least one hole formed in the first housing 210 and/or the second housing 220. According to an embodiment, at least one connector port 207 may be used to transmit and receive power and/or data to and from an external electronic device. In certain embodiments, at least one connector port (e.g., ear jack hole) may accommodate a connector (e.g., ear jack) for transmitting and receiving an audio signal to and from an external electronic device. In certain embodiments, the hole formed in the first housing 210 and/or the second housing 220 may be commonly used for the input device 203 and the sound output devices 201 and 202. In certain embodiments, the sound output devices 201 and 202 may include a speaker (e.g., piezo speaker) that operates without using a hole formed in the first housing 210 and/or the second housing 220.

According to certain embodiments, the sensor module 204 may generate an electrical signal or data value corresponding to an internal operating state of the electronic device 200 or an external environmental state. The sensor module 204 may detect an external environment, for example, through the first surface 211 of the first housing 210. In certain embodiments, the electronic device 200 may further include at least one sensor module disposed to detect an external environment through the second surface 212 of the first housing 210. According to an embodiment, the sensor module 204 (e.g., illuminance sensor) may be disposed under the flexible display 230 to detect an external environment through the flexible display 230. According to an embodiment, the sensor module 204 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor.

According to certain embodiments, the camera devices 205 and 208 may include a first camera device 205 (e.g., front camera device) disposed on the first surface 211 of the first housing 210, and a second camera device 208 disposed on the second surface 212 of the first housing 210. The electronic device 200 may further include a flash 209 disposed close to the second camera device 208. According to an embodiment, the camera device 205 or 208 may include one or more lenses, an image sensor, and/or an image signal processor. The flash 209 may include, for example, a light emitting diode or a xenon lamp. According to an embodiment, the camera devices 205 and 208 may be arranged so that two or more lenses (e.g., wide-angle lens, super-wide-angle lens, or telephoto lens) and image sensors are positioned on one surface (e.g., first surface 211, second surface 212, third surface 221, or fourth surface 222) of the electronic device 200. In certain embodiments, the camera devices 205 and 208 may include time-of-flight (TOF) lenses and/or an image sensor.

According to certain embodiments, the key input device 206 (e.g., key button) may be disposed on the third side surface 213c of the first side member 213 of the first housing 210. In certain embodiments, the key input device 206 may be disposed on at least one of the other side surfaces 213a and 213b of the first housing 210 and/or the side surfaces 223a, 223b and 223c of the second housing 220. In certain embodiments, the electronic device 200 may not include some or all of the key input devices 206, and those not included key input devices 206 may be implemented in other forms, such as soft keys, on the flexible display 230. In certain embodiments, the key input device 206 may be implemented by using a pressure sensor included in the flexible display 230.

According to certain embodiments, some of the camera devices 205 and 208 (e.g., first camera device 205) or the sensor module 204 may be disposed to be exposed through the flexible display 230. For example, the first camera device 205 or the sensor module 204 may be arranged in the internal space of the electronic device 200 so as to be in contact with the external environment through an opening (e.g., through hole) formed at least partially in the flexible display 230. In another embodiment, some sensor modules 204 may be arranged in the internal space of the electronic device 200 so as to perform their functions without being visually exposed through the flexible display 230. For example, in this case, the opening of a region of the flexible display 230 facing the sensor module may be not needed.

With reference to FIG. 3B, the electronic device 200 may be operated to remain in an intermediate state through the hinge mechanism (e.g., hinge mechanism 240 in FIG. 2B). In this case, the electronic device 200 may control the flexible display 230 to display different pieces of content on the display area corresponding to the first surface 211 and the display area corresponding to the third surface 221. According to an embodiment, the electronic device 200 may be operated substantially in an unfolded state (e.g., unfolded state of FIG. 2A) and/or substantially in a folded state (e.g., folded state of FIG. 3A) with respect to a specific inflection angle (e.g., angle between the first housing 210 and the second housing 220 in the intermediate state) through the hinge mechanism (e.g., hinge mechanism 240 in FIG. 2B). For example, when a pressing force is applied in the unfolding direction (B direction) in a state where the electronic device 200 is unfolded at a specific inflection angle, through the hinge mechanism (e.g., hinge mechanism 240 in FIG. 2B), the electronic device 200 may be transitioned to an unfolded state (e.g., unfolded state of FIG. 2A). For example, when a pressing force is applied in the folding direction (C direction) in a state where the electronic device 200 is unfolded at a specific inflection angle, through the hinge mechanism (e.g., hinge mechanism 240 in FIG. 2B), the electronic device 200 may be transitioned to a closed state (e.g., folded state of FIG. 3A). In an embodiment, the electronic device 200 may be operated to remain in an unfolded state at various angles (not shown) through the hinge mechanism (e.g., hinge mechanism 240 in FIG. 2B).

Figure 4:
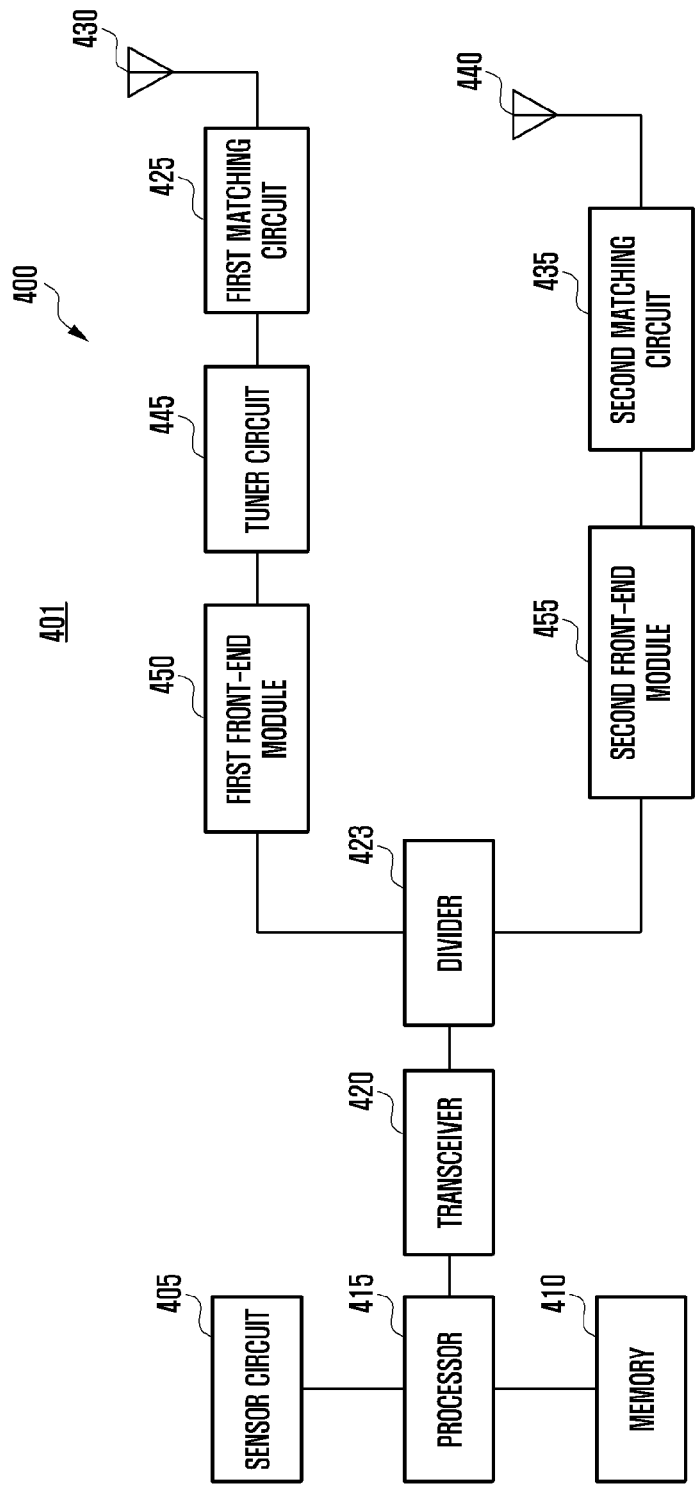
FIG. 4 is a block diagram illustrating an electronic device according to an embodiment of the disclosure.

FIG. 4 is a block diagram illustrating an electronic device according to an embodiment of the disclosure.

Referring to FIG. 4, the electronic device 401 (e.g., the electronic device 101 of FIG. 1 and the electronic device 200 of FIGS. 2A, 2B, 2C, 3A, and 3B) in a block diagram 400 may include a sensor circuit 405 (e.g., the sensor module 176 of FIG. 1), a memory 410 (e.g., the memory 130 of FIG. 1), a processor 415 (e.g., the processor 120 of FIG. 1), a transceiver 420 (e.g., the communication module 190 of FIG. 1), a divider 423, a first matching circuit 425, a first antenna 430 (e.g., the first conductive portion 216 of FIGS. 3A and 3B), a second matching circuit 435, a second antenna 440 (e.g., the second conductive portion 226 of FIGS. 3A and 3B), a tuner circuit 445, a first front-end module 450, and/or a second front-end module 455.

According to various embodiments of the disclosure, the sensor circuit 405 (e.g., the sensor module 176 of FIG. 1) may detect a folding state of the electronic device 401. For example, the sensor circuit 405 may detect whether a first housing 210 and a second housing 220 are in an unfolding state or a folding state with reference to a hinge mechanism 240 of the electronic device 401. The sensor circuit 405 may transmit a detection signal corresponding to an unfolding state or a folding state of the first housing 210 and the second housing 220 to the processor 415.

In various embodiments, the sensor circuit 405 may include at least one of an accelerometer sensor, a gyro sensor, a proximity sensor, a Hall IC, or a 6-axis sensor which are configured to detect an unfolding state or a folding state of the electronic device 401.

According to various embodiments of the disclosure, the sensor circuit 405 may detect a gripping state of the electronic device 401. For example, the sensor circuit 405 may include at least one grip sensor. The sensor circuit 405 may acquire a sensor signal related to a contact with respect to the electronic device 401 through the at least one grip sensor. The sensor circuit 405 may transmit the acquired sensor signal related to the contact with respect to the electronic device 401 to the processor 415.

According to various embodiments of the disclosure, the memory 410 (e.g., the memory 130 of FIG. 1) may store various data used by at least one component (e.g., the sensor circuit 405, the processor 415, and/or the transceiver 420) of the electronic device 401. In an embodiment, the data may include input data or output data for software (e.g., a program) and a command related thereto. In an embodiment, the data may include information related to a sensor value for determining an unfolding state (e.g., the state of FIGS. 2A, 2B, and 2C) of the electronic device 401, a sensor value for determining a folding state (e.g., the state of FIG. 3A) of the electronic device 401, and/or a sensor value for detecting a transition of the electronic device 401 from an unfolding state to a folding state. In an embodiment, the data may include information related to a sensor value for detecting a gripping state of the electronic device 401.

In various embodiments, the memory 410 may store instructions associated with various operations performed by the processor 415.

According to various embodiments of the disclosure, the processor 415 (e.g., the processor 120 of FIG. 1) may control the overall operation of the electronic device 401 and a signal flow between internal components of the electronic device 401, and perform data processing. For example, the processor 415 may include a central processing unit (CPU), an application processor (AP), and/or a communication processor (CP). The processor 415 may include a single core processor or a multi-core processor.

In various embodiments, the processor 415 may control the transceiver 420 by using a communication processor. The processor 415 may control an operation in which the transceiver 420 generates a wireless signal (e.g., a transmission signal). The processor 415 may determine wireless signals (e.g., a first transmission signal and a second transmission signal) to be radiated through the first antenna 430 and the second antenna 440 by using the transceiver 420. The processor 415 may determine phases and/or frequencies of wireless signals (e.g., the first transmission signal and the second transmission signal) for the first antenna 430 and the second antenna 440.

In various embodiments of the disclosure, the transceiver 420 (e.g., the communication module 190 of FIG. 1) may convert a wireless signal received from the first antenna 430 into digital data which can be processed (e.g., decoded) by the processor 415, and transmit the digital data to the processor 415. The transceiver 420 may convert a wireless signal received from the second antenna 440 into digital data which can be processed (e.g., decoded) by the processor 415, and transmit the digital data to the processor 415.

In various embodiments, the transceiver 420 may transmit a wireless signal (e.g., a transmission signal) to the first antenna 430 and the second antenna 440 in the form of an electromagnetic wave including a carrier. For example, the transceiver 420 may transmit a wireless signal (e.g., a transmission signal) to the divider 423. The divider 423 may divide a wireless signal (e.g., a transmission signal) received from the transceiver 420 into two signals, and transmit the two divided signals to the first antenna 430 and the second antenna 440, respectively. The transceiver 420 may include an oscillator configured to generate a carrier wave and a modulation circuit configured to modulate the carrier wave.

In various embodiments, the transceiver 420 may extract data from a wireless signal received through the first antenna 430 and the second antenna 440, and transmit the extracted data to the processor 415. The transceiver 420 may include a demodulation circuit configured to demodulate a wireless signal received from the first antenna 430 and the second antenna 440.

In an embodiment, the first antenna 430 (e.g., the first conductive portion 216) may be disposed between a first segmentation portion 2161 and a second segmentation portion 2162 formed on a first side surface 213a of the first housing 210. The first antenna 430 may be electrically connected to the processor 415 disposed on a printed circuit board (not shown). The first antenna 430 may transmit or receive a signal of a designated first frequency band. In various embodiments, the first antenna 430 may be a diversity antenna (e.g., a diversity rx (Drx) antenna) for reinforcing a wireless signal received by the second antenna 440.

In an embodiment, the second antenna 440 (e.g., the second conductive portion 226) may be disposed between a third segmentation portion 2261 and a fourth segmentation portion 2262 formed on a fourth side surface 223a of the second housing 220. The second antenna 440 may be electrically connected to the processor 415 disposed on the printed circuit board (not shown). The second antenna 440 may transmit or receive a signal of a designated second frequency band. In various embodiments, the second antenna 440 may be a main antenna (e.g., a primary rx (Prx) antenna) configured to transmit and/or receive a wireless signal.

According to various embodiments of the disclosure, the first matching circuit 425 may perform impedance matching of a wireless signal transmitted to the first antenna 430. The second matching circuit 435 may perform impedance matching of a wireless signal transmitted to the second antenna 440.

According to various embodiments of the disclosure, the tuner circuit 445 may be disposed in the processor 415 and the first matching circuit 425, and a time constant for adjusting a phase of the first antenna 430 may be configured by the processor 415.

According to various embodiments of the disclosure, the first front-end module 450 may include a power amplifier (not shown) configured to amplify a signal transmitted by the transceiver 420 and transmit the amplified signal to the first antenna 430, a low-noise amplifier (LNA) (not shown) configured to amplify a signal received through the first antenna 430 and transmit the amplified signal to the transceiver 420, and/or a filter (not shown).

According to various embodiments of the disclosure, the second front-end module 455 may include a power amplifier (not shown) configured to amplify a signal transmitted by the transceiver 420 and transmit the amplified signal to the second antenna 440, a low-noise amplifier (LNA) (not shown) configured to amplify a signal received through the second antenna 440 and transmit the amplified signal to the transceiver 420, and/or a filter (not shown).

In various embodiments of the disclosure, although not shown, the electronic device 401 may include a coupler disposed between the second matching circuit 435 and the second front-end module 455.

Figure 5:
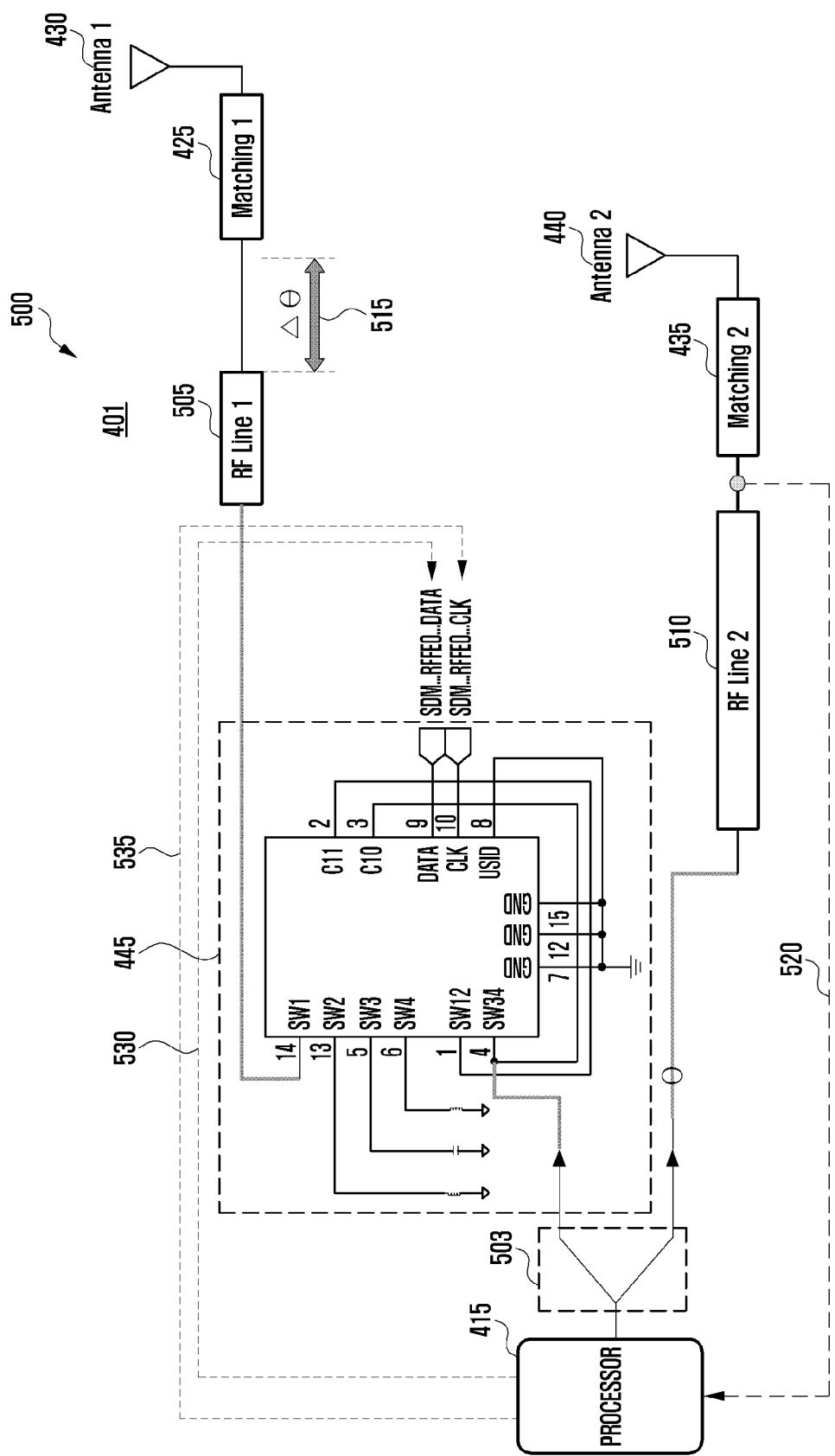
FIG. 5 is a diagram illustrating an operating method of an antenna according to an embodiment of the disclosure.

FIG. 5 is a diagram illustrating an operating method of an antenna according to an embodiment of the disclosure.

Referring to FIG. 5, in a diagram 500, an electronic device (e.g., the electronic device 401 of FIG. 4) may include the processor 415, the tuner circuit 445, the first matching circuit 425, the first antenna 430, the second matching circuit 435, and/or the second antenna 440.

In various embodiments, when a folding state of the first housing 210 and the second housing 220 of the electronic device 401 is detected through a sensor circuit (e.g., the sensor circuit 405 of FIG. 4), the processor 415 may control a phase of a signal of the first antenna 430 included in the first housing 210 and/or the second antenna 440 included in the second housing 220, so as to control that current flows in the same direction in the first antenna 430 and/or the second antenna 440, and/or control that the phases are the same. By controlling that current flows in the same direction and/or controlling that the phases are the same, current and/or magnetic field interference may be minimized in a state where the electronic device 401 is folded.

In various embodiments, the processor 415 and the first antenna 430 may be electrically connected by a first signal line 505. The processor 415 and the second antenna 440 may be electrically connected by a second signal line 510.

In various embodiments, the first antenna 430 may be a diversity antenna (e.g., a diversity rx (Drx) antenna) for reinforcing a wireless signal received by the second antenna 440. The second antenna 440 may be a main antenna (e.g., a primary rx (Prx) antenna) configured to transmit and/or receive a wireless signal. The disclosure is not limited thereto, and in various embodiments, the first antenna 430 may be a main antenna (e.g., a Prx antenna) configured to transmit and/or receive a wireless signal, and the second antenna 440 may be a diversity antenna (e.g., a Drx antenna) for reinforcing a wireless signal received by the first antenna 430.

In various embodiments, when the electronic device 401 is in a folding state (e.g., the state of FIG. 3A), the electronic device 401 may be configured as a closed loop circuit which may control that phase information of the second antenna 440 is received, and a time constant for adjusting a phase of the first antenna 430 is configured using the tuner circuit 445 disposed on the first signal line 505. For example, a signal (e.g., a Tx signal) output through a power amplifier (not shown) of the second front-end module 455 may be coupled through a coupler (not shown). The coupled signal may be feedback to the processor 415 through a third signal line 520. For example, the transceiver 420 may down-convert the feedback signal to lower a frequency of the feedback signal. The transceiver 420 may transmit the down-converted signal to the processor 415. The processor 415 may detect a phase of the signal, based on the signal received from the transceiver 420. The tuner circuit 445 may be disposed on the first signal line 505. Based on the phase of the signal detected using the tuner circuit 445, the processor 415 may configure a time constant (e.g., an inductor L and/or a capacitance C) for adjusting a phase of the first antenna 430.

In various embodiments, a phase difference 515 may be caused by a length difference between the first signal line 505 and the second signal line 510. For example, the processor 415 may configure a time constant for adjusting a phase of a signal transmitted to the first antenna 430 corresponding to a phase (e.g., a phase of the signal feedback through the third signal line 520) of the second antenna 440 in order to reduce the phase difference. The processor 415 may transmit 530 and 535 the configured time constant (e.g., an inductor L and/or a capacitance C) to the tuner circuit 445.

In various embodiments, the first matching circuit 425 may perform impedance matching between the first antenna 430 and a transmission/reception circuit. The second matching circuit 435 may perform impedance matching between the second antenna 440 and the transmission/reception circuit.

In various embodiments, the electronic device 401 can variably configure a time constant of the first antenna 430 to correspond to a phase of the second antenna 440 by using the tuner circuit 445, and thus a phase deviation of signals transmitted to the first antenna 430 and the second antenna 440 may be reduced.

In various embodiments, since the electronic device 401 can variably configure a time constant of the first antenna 430 to correspond to a phase of the second antenna 440 by using the tuner circuit 445, a phase difference between the first antenna 430 (e.g., a Drx antenna) and the second antenna 440 (e.g., a Prx antenna) may be reduced, and thus antenna performance may be improved in a state where the electronic device 401 is folded.

Figure 6:
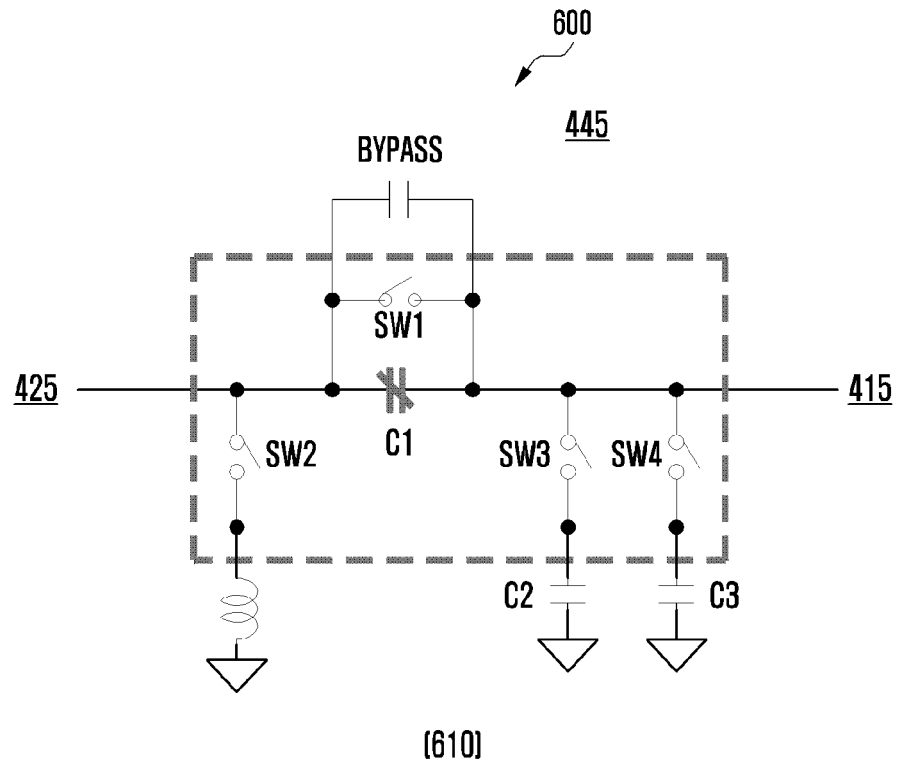
FIG. 6 is a diagram illustrating a tuner circuit according to an embodiment of the disclosure.
Figure 6:
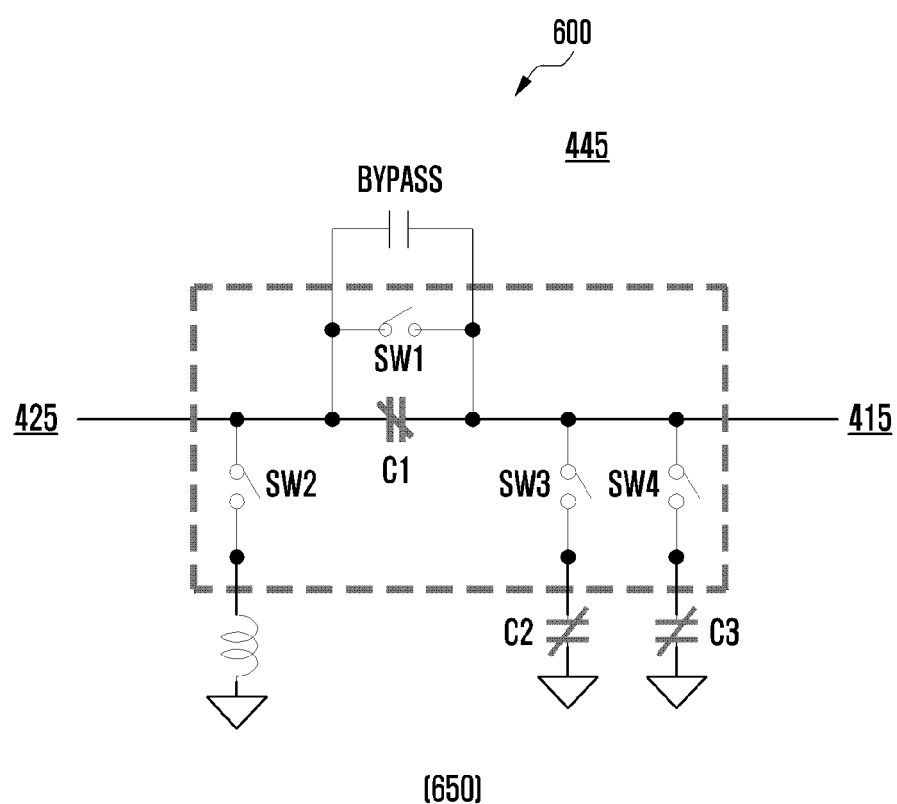

FIG. 6 is a diagram illustrating a tuner circuit according to an embodiment of the disclosure.

Referring to FIG. 6, in diagram 600, in panel 610, the tuner circuit 445 may be disposed between the processor 415 and the first matching circuit 425, for example, on a first signal line (e.g., the first signal line 505 of FIG. 5). In various embodiments, the tuner circuit 445 may include a first switch SW1, a second switch SW2, a third switch SW3, a fourth switch SW4, and/or a variable capacitance C1.

In various embodiments, the first switch SW1 may be a bypass switch for switching whether a bypass path is connected or not. The tuner circuit 445 may include at least one time constant selectively connected to the ground through the second switch SW2, the third switch SW3, or the fourth switch SW4. The at least one time constant may include an inductor L and/or a capacitor C. The tuner circuit 445 may control the second switch SW2, the third switch SW3, or the fourth switch SW4 to allow selective use of at least one time constant for adjusting a phase of a first antenna (e.g., the first antenna 430 of FIG. 4) through a variable capacitance C1.

In various embodiments, referring to panel 650, the tuner circuit 445 disposed between the processor 415 and the first matching circuit 425, for example, on a first signal line (e.g., the first signal line 505 of FIG. 5) may include the first switch SW1, the second switch SW2, the third switch SW3, the fourth switch SW4, a first variable capacitance C1, a second variable capacitance C2, and/or a third variable capacitance C3.

In various embodiments, the first switch SW1 may be a bypass switch for switching whether a bypass path is connected or not. The tuner circuit 445 may include at least one time constant selectively connected to the ground through the second switch SW2, the third switch SW3, or the fourth switch SW4. The at least one time constant may include an inductor and/or a variable capacitor. The tuner circuit 445 may control the second switch SW2, the third switch SW3, or the fourth switch SW4 to allow selective use of at least one time constant for adjusting a phase of a first antenna (e.g., the first antenna 430 of FIG. 4) through the first variable capacitance C1, the second variable capacitance C2, and/or the third variable capacitance C3.

Figure 7:
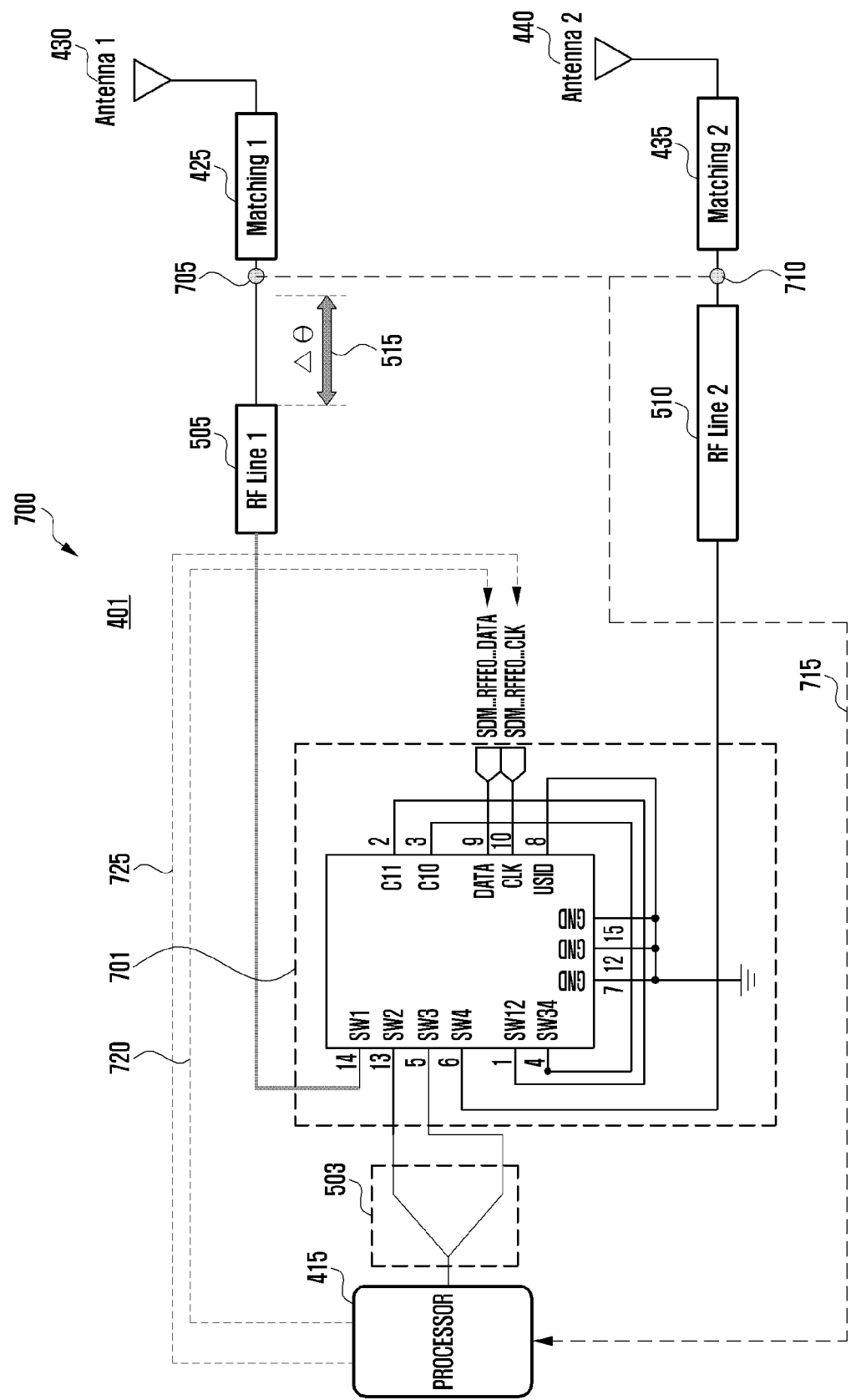
FIG. 7 is a diagram illustrating an operating method of an antenna according to an embodiment of the disclosure.

FIG. 7 is a diagram illustrating an operating method of an antenna according to an embodiment of the disclosure.

Referring to FIG. 7, in a diagram 700, an electronic device (e.g., the electronic device 401 of FIG. 4) may include the processor 415, a phase shifter 701, the first matching circuit 425, the first antenna 430 (e.g., a Drx antenna), the second matching circuit 435, and/or the second antenna 440 (e.g., a Prx antenna).

Referring to FIG. 5 described above according to various embodiments, although it has been described that the tuner circuit 445 is disposed on the first signal line 505 and configures a time constant for adjusting a phase of a signal transmitted to the first antenna 430 corresponding to a phase (e.g., a phase of the signal feedback through the third signal line 520) of the second antenna 440, the disclosure is not limited thereto. For example, in FIG. 7 according to various embodiments, the electronic device 401 may include the phase shifter 701 disposed between the processor 415 and the first matching circuit 425 and the second matching circuit 435.

In various embodiments, the processor 415 may receive, in a process operation, feedback 715 of a phase (e.g., a phase of a signal transmitted to the first antenna 430 (e.g., a Drx antenna)) of a first feedback point 705 in the first signal line 505 and a phase (e.g., a phase of a signal transmitted to the second antenna 440 (e.g., a Prx antenna)) of a second feedback point 710 in the second signal line 510. The processor 415 may use the feedback phase of the first feedback point 705 and the feedback phase of the second feedback point 710 to calibrate a phase difference between the first antenna 430 and the second antenna 440. For example, the processor 415 may set a control value of the phase shifter 701 using the phase of the first feedback point 705 and the phase of the second feedback point 710. The processor 415 may transmit 720 and 725 the set control value (e.g., an inductor L and/or a capacitance C) of the phase shifter 701 to the phase shifter 701. The processor 415 may calibrate the phase difference between the first antenna 430 and the second antenna 440 using the set control value of the phase shifter 701. The processor 415 may store, in a memory (e.g., the memory 410 of FIG. 4), a phase of a signal transmitted to the first antenna 430 and the second antenna 440, in which the phase difference is calibrated in the process operation.

Referring to FIG. 7 according to various embodiments, the electronic device 401 may perform calibration between the first antenna 430 and the second antenna 440 for each set in the process operation, and perform a data value (e.g., a phase shift value for adjusting a phase of a signal transmitted to the first antenna 430 and the second antenna 440) optimized for each set in the form of a hard-coded program.

In various embodiments, if it is identified that the electronic device 401 is in a folding state (e.g., the state of FIG. 3A), the processor 415 may control a phase of a signal transmitted to the first antenna 430 and the second antenna 440 by changing the phase to a control value (e.g., a required control value for phase shift) of the phase shifter 701 stored in the memory 410.

In an embodiment, the electronic device 401 may include a divider 503 disposed between the processor 415 and the phase shifter 701. The divider 503 may branch a wireless signal received from the transceiver 420 to the first antenna 430 and the second antenna 440. For example, the wireless signal branched by the divider 503 may be input to the phase shifter 701. In an embodiment, the phase shifter 701 may include multiple input/output terminals. For example, the phase shifter 701 may be designed to receive two signals from the divider 503 and output two signals. For example, a first wireless signal distributed by the divider 503 may be input to the second switch SW2 of the phase shifter 701. The phase shifter 701 may adjust a phase of the first wireless signal, based on the phase of the signal transmitted to the first antenna 430 stored in the memory 410. The phase shifter 701 may output the first wireless signal having the adjusted phase to the first switch SW1. The output first wireless signal having the adjusted phase may be transmitted to the first antenna 430. A second wireless signal distributed by the divider 503 may be input to the third switch SW3 of the phase shifter 701. The phase shifter 701 may adjust a phase of the second wireless signal, based on the phase of the signal transmitted to the second antenna 440 stored in the memory 410. The phase shifter 701 may output the second wireless signal having the adjusted phase to the fourth switch SW4. The output second wireless signal having the adjusted phase may be transmitted to the second antenna 440.

In various embodiments, the phase of the signal transmitted to the first antenna 430 and the second antenna 440 can be controlled through the phase difference calibration performed in advance in the process operation by using the phase shifter 701, so that the phase difference between the first antenna 430 and the second antenna 440 may be reduced.

Figure 8:
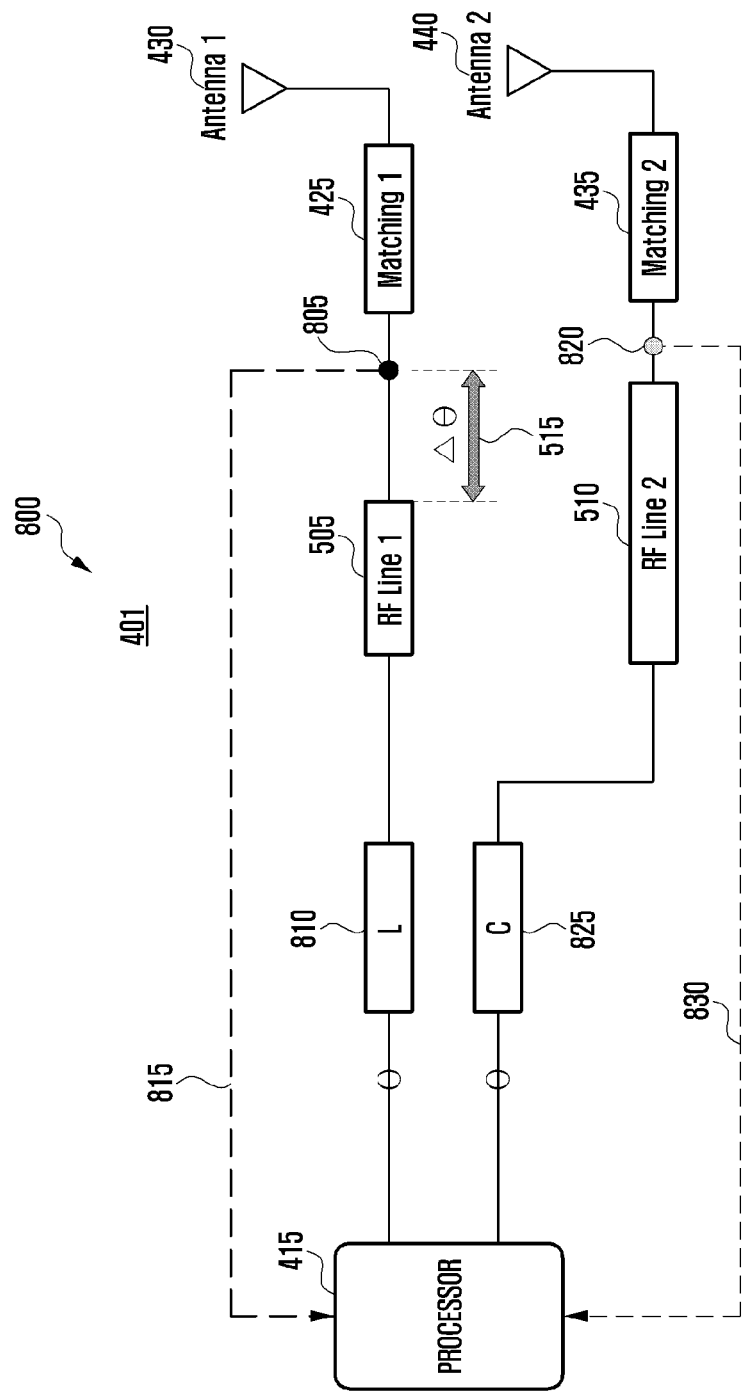
FIG. 8 is a diagram illustrating an operating method of an antenna according to an embodiment of the disclosure.

FIG. 8 is a diagram illustrating an operating method of an antenna according to an embodiment of the disclosure.

Referring to FIG. 8, in a diagram 800, the electronic device 401 (e.g., the electronic device 401 of FIG. 4) may include the processor 415, an inductor L 810, a capacitor C 825, the first matching circuit 425, the first antenna 430 (e.g., a Drx antenna), the second matching circuit 435, and/or the second antenna 440 (e.g., a Prx antenna).

In various embodiments, when the electronic device 401 is in a folding state (e.g., the state of FIG. 3A), the electronic device 401 may receive feedback of a phase of a signal transmitted to the first antenna 430 and the second antenna 440, and may be configured as a closed loop circuit which may control that a time constant for adjusting a phase of a signal transmitted to the first antenna 430 and the second antenna 440 is configured by using the inductor L 810 disposed on the first signal line 505 and the capacitor 825 disposed on the second signal line 510. For example, the processor 415 may receive feedback of a phase (e.g., a phase of a signal transmitted to the first antenna 430 (e.g., a Drx antenna)) of a first feedback point 805 in the first signal line 505 and a phase (e.g., a phase of a signal transmitted to the second antenna 440 (e.g., a Prx antenna)) of a second feedback point 820 in the second signal line 510, through a third signal line 815 and a fourth signal line 830. The processor 415 may compare the phase of the signal feedback through the third signal line 815 with the phase of the signal feedback through the fourth signal line 830. The processor 415 may detect a phase difference between the signal feedback through the third signal line 815 and the signal feedback through the fourth signal line 830, based on the comparison.

The disclosure is not limited thereto, and the processor 415 may detect a phase difference, based on a signal received from the first antenna 430 (e.g., a Drx antenna) and a signal received from the second antenna 440 (e.g., a Prx antenna). For example, the processor 415 may receive a reference signal transmitted by a base station through the first antenna 430 and the second antenna 440. The processor 415 may detect a phase difference, based on a reference signal received through the first antenna 430 and a reference signal received through the second antenna 440.

Although it has been described that a phase of a signal is adjusted through the tuner circuit 445 in FIG. 6 according to various embodiments or a phase of a signal is adjusted through the phase shifter 701 in FIG. 7, the disclosure is not limited thereto. For example, in FIG. 8, the processor 415 may compensate for and output a phase (e.g., phase delay), based on the detected phase difference. For example, the first antenna 430 and the second antenna 440 may be connected to a separate port through a signal line different from that of the processor 415, and thus a different phase (e.g., phase delay) may be applied.

In an embodiment, the electronic device 401 may include the inductor L 810 and the capacitor C 825. The processor 415 may compensate for a phase (e.g., phase delay) by using the inductor L 810 and the capacitor 825. For example, the processor 415 may configure a time constant (e.g., the inductor L 810) for adjusting a phase of a signal transmitted to the first antenna 430, and a time constant (e.g., the capacitor C 825) for adjusting a phase of a signal transmitted to the second antenna 440, based on the phase of the first feedback point 805 and the phase of the second feedback point 820, which are feedback through the third signal line 815 and the fourth signal line 830.

Referring to FIG. 8, the electronic device 401 may perform calibration between the first antenna 430 and the second antenna 440 for each set in a process operation, and perform a data value (e.g., a time constant for adjusting a phase of a signal transmitted to the first antenna 430 and the second antenna 440) optimized for each set, in the form of a hard-coding and a soft-coding program.

Referring to FIG. 8, without a separate circuit, the phase of the signal transmitted to the first antenna 430 and the second antenna 440 may be adjusted by applying a variable time constant by soft-coding and hard-coding, so that material costs can be reduced.

Figure 9:
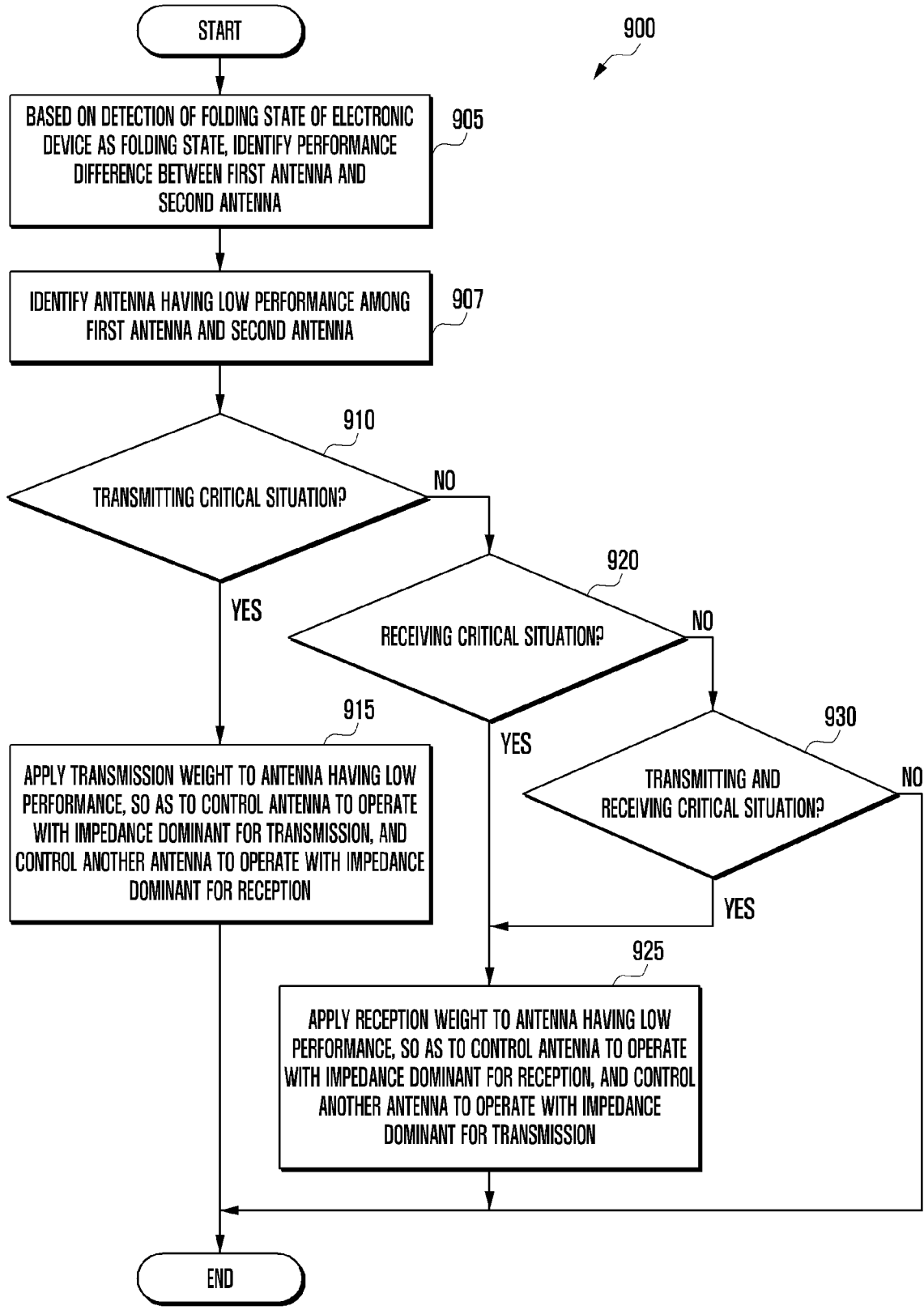
FIG. 9 is a flowchart illustrating an operating method of an antenna according to an embodiment of the disclosure.

FIG. 9 is a flowchart illustrating an operating method of an antenna according to an embodiment of the disclosure.

Referring to FIG. 9, in a method 900, in operation 905, a processor (e.g., the processor 415 of the electronic device 401 of FIG. 4) may identify a performance difference between a first antenna (e.g., the first antenna 430 of FIG. 4) and a second antenna (e.g., the second antenna 440 of FIG. 4), based on the detection of a folding state of the electronic device 401 as a folding state (e.g., the state of FIG. 3A).

In an embodiment, the electronic device 401 may include a hinge module (e.g., the hinge mechanism 240 of FIG. 2B), a first housing (e.g., the first housing 210 of FIG. 2A) which is at least partially coupled to a first side of the hinge mechanism 240 and includes the first antenna 430, and a second housing (e.g., the second housing 220 of FIG. 2A) which is at least partially coupled to a second side of the hinge mechanism 240, is configured to be foldable and unfoldable with the first housing 210 by using the hinge mechanism 240, and includes the second antenna 440. Based on a sensor value obtained through the sensor circuit 405, the electronic device 401 may determine whether the first housing 210 and the second housing 220 are in an unfolding state (e.g., the state of FIGS. 2A, 2B, and 2C) or in a folding state (e.g., the state of FIG. 3A).

Referring to FIG. 5, the processor 415 and the first antenna 430 may be connected by a first signal line (e.g., the first signal line 505 of FIG. 5). The processor 415 and the second antenna 440 may be connected by a second signal line (e.g., the second signal line 510 of FIG. 5). The electronic device 401 may include a first tuner circuit (e.g., the tuner circuit 445 of FIG. 4) disposed on the first signal line 505 which electrically connects the processor 415 and the first antenna 430. The electronic device 401 may include a second tuner circuit (not shown) disposed on the second signal line 510 which electrically connects the processor 415 and the second antenna 440. For example, a second matching circuit (e.g., the second matching circuit 435 of FIG. 4) may be configured as a second tuner circuit. The second tuner circuit may be implemented in the same manner as the first tuner circuit 445.

In various embodiments, radiation performance and/or radiation characteristics of the electronic device 401 according to a control of a tuner circuit (e.g., the first tuner circuit 445 and the second tuner circuit) may be identified through an experiment. The radiation performance and/or radiation characteristics of the electronic device 401 according to the control of the tuner circuit, which have been identified through the experiment, may be stored in a memory (e.g., the memory 410 of FIG. 4) of the electronic device 401 in the form of a lookup table.

In an embodiment, total radiated power (TRP) and/or total isotropic sensitivity (TIS) may be measured through an experiment, and a performance difference between the first antenna 430 and the second antenna 440 according to the measured total radiated power and/or total isotropic sensitivity, for example, a performance imbalance may be identified.

In an embodiment, a conduction loss and/or a radiation difference may be identified through an experiment. The conduction loss and/or radiation difference may be stored in the memory 410 of the electronic device 401 in the form of a lookup table. The processor 415 may identify a performance difference between the first antenna 430 and the second antenna 440 according to the conduction loss and/or radiation difference from the lookup table stored in the memory 410.

In various embodiments, the first antenna 430 (e.g., the first conductive portion 216) may be disposed between the first segmentation portion 2161 and the second segmentation portion 2162 formed on the first side surface 213*a* of the first housing 210. The first antenna 430 may be electrically connected to the processor 415 disposed on a printed circuit board (not shown). The first antenna 430 may transmit or receive a signal of a designated first frequency band. In various embodiments, the first antenna 430 may include a first feeding point integrally coupled to the inside thereof. The first feeding point may be electrically connected to a first signal connection member (not shown) connected to the printed circuit board (not shown). For example, the first signal connection member (not shown) may include one of a coaxial cable, a flexible printed circuit board (FPCB), or an FPCB type radio frequency (RF) cable (FRC).

In various embodiments, the second antenna 440 (e.g., the second conductive portion 226) may be disposed between the third segmentation portion 2261 and the fourth segmentation portion 2262 formed on the fourth side surface 223*a* of the second housing 220. The second antenna 440 may be electrically connected to the processor 415 disposed on the printed circuit board (not shown). The second antenna 440 may transmit or receive a signal of a designated second frequency band. In various embodiments, the second antenna 440 may include a second feeding point integrally coupled to the inside thereof. The second feeding point may be electrically connected to a second signal connection member (not shown) connected to the printed circuit board (not shown). For example, the second signal connection member may include one of a coaxial cable, a flexible printed circuit board (FPCB), or an FPCB type RF cable (FRC).

In various embodiments, the electronic device 401 may include a power divider for supplying power to each of the first signal connection member of the first antenna 430 and the second signal connection member of the second antenna 440. In an embodiment, the power divider may be disposed between the processor 415 and the first antenna 430 and the second antenna 440 so as to distribute power to the first antenna 430 and the second antenna 440.

In various embodiments, when a wireless signal is transmitted from the processor 415 to the first antenna 430 and the second antenna 440, a wireless signal passing through the power divider, for example, one carrier may be divided into two carriers. For example, a first carrier among the two carriers may be transmitted to the first antenna 430. A second carrier among the two divided carriers may be transmitted to the second antenna 440.

In various embodiments, when power is supplied to each of the first antenna 430 and the second antenna 440 by the power divider, the magnitude of the power supplied to each of the first antenna 430 and the second antenna 440 may be reduced. For example, when power of 24 dBm is supplied to the first antenna 430 and the second antenna 440, the power of 24 dBm may be reduced to a predetermined magnitude and thus supplied to the first antenna 430 and the second antenna 440. For example, the power of 24 dBm may be reduced by 3 dBm, so that power of 21 dBm may be supplied to each of the first antenna 430 and the second antenna 440. The above-described magnitude of power according to various embodiments is an embodiment, and is not limited to the above-described numerical value.

In an embodiment, depending on a length, artwork, and placement position of a signal connection member (e.g., a first signal connection member and a second signal connection member), a difference may occur in conduction power and/or sensitivity reaching the first feeding point and the second feeding point in each of the first antenna 430 and the second antenna 440. Accordingly, total radiated power (TRP) and/or total isotropic sensitivity (TIS) imbalance occur due to a radiation gain difference between the first antenna 430 and the second antenna 440, so that the total TRP and/or TIS finally radiated from the first antenna 430 and the second antenna 440 may be reduced.

In various embodiments, when a performance difference between the first antenna 430 and the second antenna 440 occurs, in operation 907, the processor 415 may identify an antenna having low performance among the first antenna 430 and the second antenna 440.

In various embodiments, in operation 910, the processor 415 may determine whether a transmitting critical situation is identified.

In an embodiment, the processor 415 may determine whether a transmitting critical situation is identified, based on a result of transmitting a wireless signal, by using the first antenna 430 and the second antenna 440. For example, the processor 415 may determine whether a transmitting critical situation is identified, based on Tx automatic gain control (AGC) of the first antenna 430 and Tx AGC of the second antenna 440.

In an embodiment, if the transmitting critical situation is identified (e.g., YES in operation 910), in operation 915, the processor 415 may apply a transmission weight to an antenna (e.g., the first antenna 430 or the second antenna 440) having low performance, so as to control the antenna to operate with an impedance dominant for transmission, and control another antenna (e.g., the second antenna 440 or the first antenna 430) to operate with an impedance dominant for reception.

In an embodiment, if the transmitting critical situation is not identified (e.g., NO in operation 910), in operation 920, the processor 415 may determine whether a receiving critical situation is identified. In an embodiment, the processor 415 may determine whether a receiving critical situation is identified, based on a result of receiving a wireless signal, by using the first antenna 430 and the second antenna 440. For example, the processor 415 may receive a reference signal transmitted by a base station through the first antenna 430 and the second antenna 440. The processor 415 may determine whether a receiving critical situation is identified, based on a reference signal received through the first antenna 430 and a reference signal received through the second antenna 440.

In an embodiment, if the receiving critical situation is identified (e.g., YES in operation 920), the processor 415 may apply a reception weight to an antenna (e.g., the first antenna 430 or the second antenna 440) having low performance, so as to control the antenna to operate with the impedance dominant for reception, and control another antenna (e.g., the second antenna 440 or the first antenna 430) to operate with the impedance dominant for transmission.

In an embodiment, if the receiving critical situation is not identified (e.g., NO in operation 920), in operation 930, the processor 415 may determine whether a transmitting and receiving critical situation is identified. If the transmitting and receiving critical situation is identified (e.g., YES in operation 930), the processor 415 may perform operation 925. If the transmitting and receiving critical situation is not identified (e.g., NO in operation 930), the processor 415 may end an operation of controlling the antenna.

Figure 10:
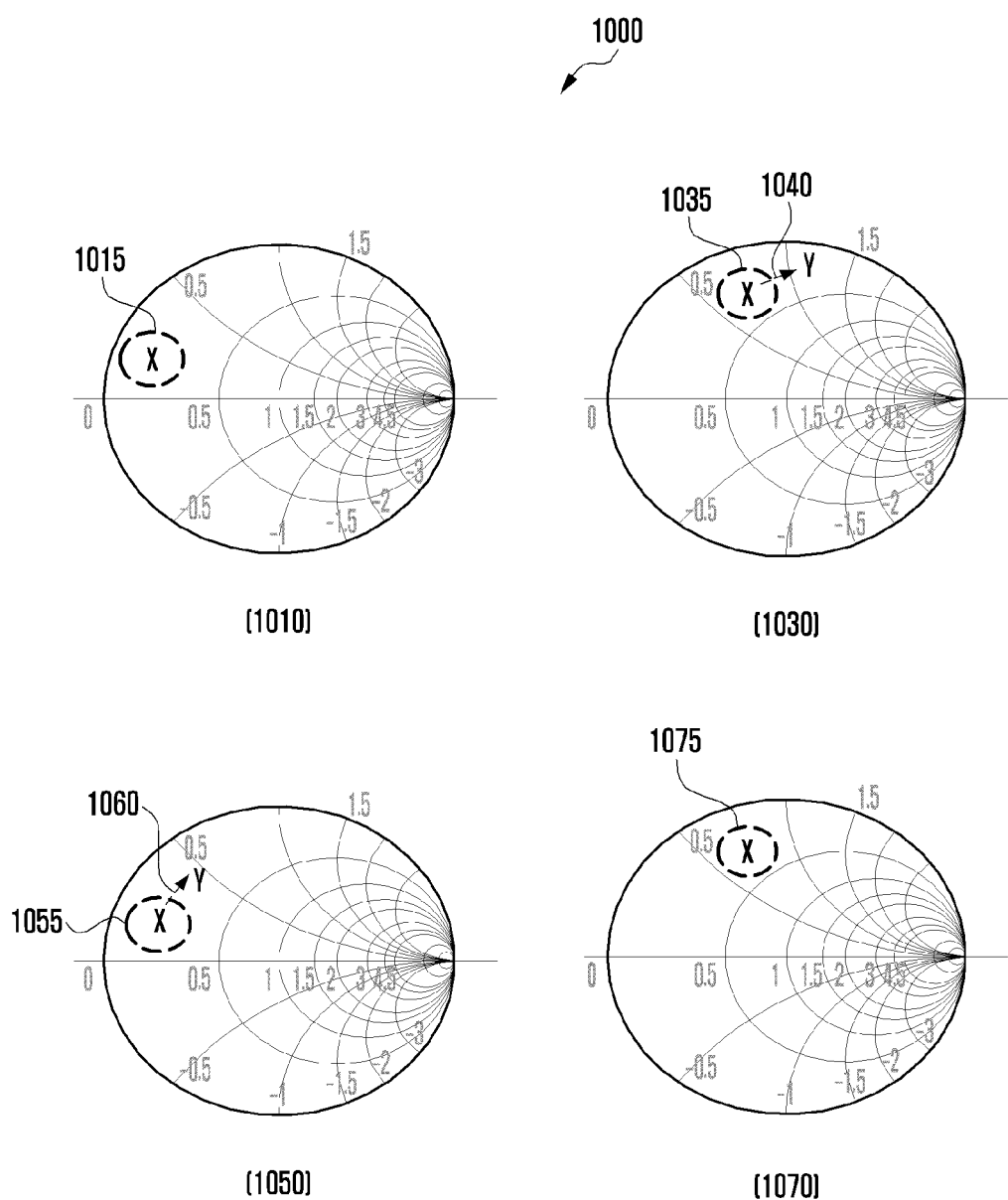
FIG. 10 is a diagram illustrating an impedance operation in a folding state of an electronic device, according to an embodiment of the disclosure.

FIG. 10 is a diagram illustrating an impedance operation in a folding state of an electronic device, according to an embodiment of the disclosure.

Referring to FIG. 10, in a diagram 1000, if it is identified that an electronic device (e.g., the electronic device 401 of FIG. 4) is in a folding state (e.g., the state of FIG. 3A), the electronic device 401 may identify a performance difference between a first antenna (e.g., the first antenna 430 of FIG. 4) and a second antenna (e.g., the second antenna 440 of FIG. 4), for example, a performance imbalance. When a performance difference between the first antenna 430 and the second antenna 440 occurs, the electronic device 401 may identify an antenna having low performance among the first antenna 430 and the second antenna 440, and determine whether a transmitting critical situation or a receiving critical situation is identified, based on an electric field condition. In an embodiment, the electric field condition may include automatic gain control (AGC) and/or signal to noise ratio (SNR). However, the disclosure is not limited thereto.

Referring to FIG. 5, the processor 415 and the first antenna 430 may be connected by a first signal line (e.g., the first signal line 505 of FIG. 5). The processor 415 and the second antenna 440 may be connected by a second signal line (e.g., the second signal line 510 of FIG. 5).

In various embodiments, the electronic device 401 may include a first tuner circuit (e.g., the tuner circuit 445 of FIG. 5) disposed on the first signal line 505, and a second tuner circuit (not shown) disposed on the second signal line 510.

In an embodiment, if it is identified that the electronic device 401 is in a folding state, the processor 415 may identify a performance imbalance between the first antenna 430 and the second antenna 440, and identify an antenna having low performance among the first antenna 430 and the second antenna 440.

Referring again to FIG. 10, in panel 1010 and panel 1030 according to various embodiments, it is assumed that an antenna having low performance among the first antenna 430 and the second antenna 440 is the first antenna 430.

In various embodiments, the electronic device 401 may determine whether a transmitting critical situation and/or a receiving critical situation is identified, based on an electric field condition such as whether AGC is greater than 200 and/or SNR is greater than 5. The electronic device 401 may control the first tuner circuit 445 and the second tuner circuit (not shown) to operate with an impedance dominant for transmission or to operate with an impedance dominant for reception as shown in Table 1 below, based on whether a transmitting critical situation and/or a receiving critical situation is identified.

TABLE 1

| | Tx AGC | SNR | First tuner circuit | Second tuner circuit |
|---|---|---|---|---|
| Tx critical situation | 200 or more | 5 or more | Tx Best | Rx Best |
| Rx critical situation | less than 200 | less than 5 | Rx Best | Tx Best |
| Tx and Rx critical situation | 200 or more | less than 5 | Rx Best | Tx Best |

In various embodiments, if a transmitting critical situation is identified, based on AGC which is 200 or more and SNR which is 5 or more, the electronic device 401 may control the first antenna 430 having low performance to operate with an impedance (Tx best impedance) dominant for transmission. For example, as the first antenna 430 having low performance continues to operate with the impedance dominant for transmission in the transmitting critical situation, an impedance point 1015 of the first antenna 430 may be maintained as shown by panel 1010.

In various embodiments, the electronic device 401 may control the second antenna 440, which is the antenna other than the first antenna 430 having low performance, to operate with an impedance (Rx best impedance) dominant for reception within a transmission tolerance (Tx tolerance). In an embodiment, the Tx tolerance can be optimized. For example, as the second antenna 440 operates with the impedance dominant for reception, as shown in panel 1030, an impedance of the second antenna 440 may be changed from a first point 1035 to a second point 1040. For example, the second point 1040 may be a point for the antenna to operate with the impedance dominant for reception.

In various embodiments, although not shown, if a receiving critical situation is identified, based on AGC which is less than 200 and SNR which is less than 5, the electronic device 401 may control the first antenna 430 having low performance to operate with an impedance (Rx best impedance) dominant for reception. The electronic device 401 may control the second antenna 440, which is the antenna other than the first antenna 430 having low performance, to operate with an impedance (Tx best impedance) dominant for transmission.

In various embodiments, although not shown, if a transmitting and receiving critical situation is identified, based on AGC which is 200 or more and SNR which is less than 5, the electronic device 401 may control the first antenna 430 having low performance to operate with an impedance (Rx best impedance) dominant for reception. The electronic device 401 may control the second antenna 440, which is the antenna other than the first antenna 430 having low performance, to operate with an impedance (Tx best impedance) dominant for transmission.

In panel 1050 and panel 1070 according to various embodiments, it is assumed that an antenna having low performance among the first antenna 430 and the second antenna 440 is the second antenna 440.

In various embodiments, the electronic device 401 may determine whether a transmitting critical situation and/or a receiving critical situation is identified, based on an electric field condition such as whether AGC is greater than 200 and/or SNR is greater than 5. The electronic device 401 may control the first tuner circuit 445 and the second tuner circuit (not shown) to operate with the impedance dominant for transmission or to operate with the impedance dominant for reception as shown in Table 2 below, based on whether a transmitting critical situation and/or a receiving critical situation is identified.

TABLE 2

| | Tx AGC | SNR | First tuner circuit | Second tuner circuit |
|---|---|---|---|---|
| Tx critical situation | 200 or more | 5 or more | Rx Best | Tx Best |
| Rx critical situation | less than 200 | less than 5 | Tx Best | Rx Best |
| Tx and Rx critical situation | 200 or more | less than 5 | Tx Best | Rx Best |

In various embodiments, the electronic device 401 may control the first antenna 430, which is the antenna other than the second antenna 440 having low performance, to operate with an impedance (Rx best impedance) dominant for reception within a transmission tolerance (Tx tolerance). In an embodiment, the Tx tolerance can be optimized. For example, as the first antenna 430 operates with the impedance dominant for reception, as shown panel 1050, an impedance of the first antenna 430 may be changed from a first point 1055 to a second point 1060. For example, the second point 1060 may be a position for the antenna to operate with the impedance dominant for reception.

In various embodiments, if a transmitting critical situation is identified, based on AGC which is 200 or more and SNR which is 5 or more, the electronic device 401 may control the second antenna 440 having low performance to operate with an impedance (Tx best impedance) dominant for transmission. For example, as the second antenna 440 continues to operate with the impedance dominant for transmission in the transmitting critical situation, an impedance point 1075 of the second antenna 440 may be maintained as shown in panel 1070.

In various embodiments, although not shown, if a receiving critical situation is identified, based on AGC which is less than 200 and SNR which is less than 5, the electronic device 401 may control the second antenna 440 having low performance to operate with an impedance (Rx best impedance) dominant for reception. The electronic device 401 may control the first antenna 430, which is the antenna other than the second antenna 440 having low performance, to operate with an impedance (Tx best impedance) dominant for transmission.

In various embodiments, although not shown, if a transmitting and receiving critical situation is identified, based on AGC which is 200 or more and SNR which is less than 5, the electronic device 401 may control the second antenna 440 having low performance to operate with an impedance (Rx best impedance) dominant for reception. The electronic device 401 may control the first antenna 430, which is the antenna other than the second antenna 440 having low performance, to operate with an impedance (Tx best impedance) dominant for transmission.

Referring to FIGS. 9 and 10, in the case of a transmitting critical situation, the processor 415 may apply a transmission weight to an antenna (e.g., the first antenna 430 or the second antenna 440) having low performance to control the antenna to operate with an impedance dominant for transmission, and to control another antenna (e.g., the second antenna 440 or the first antenna 430) to operate with an impedance dominant for reception, so that a performance difference between the first antenna 430 and the second antenna 440, for example, a performance imbalance may be minimized. Alternatively, in the case of a receiving critical situation, or in the case of a transmitting and receiving critical situation, the processor 415 may apply a reception weight to an antenna (e.g., the first antenna 430 or the second antenna 440) having low performance to control the antenna to operate with the impedance dominant for reception, and to control another antenna (e.g., the second antenna 440 or the first antenna 430) to operate with the impedance dominant for transmission, so that a performance difference between the first antenna 430 and the second antenna 440, for example, a performance imbalance can be minimized.

Figure 11:
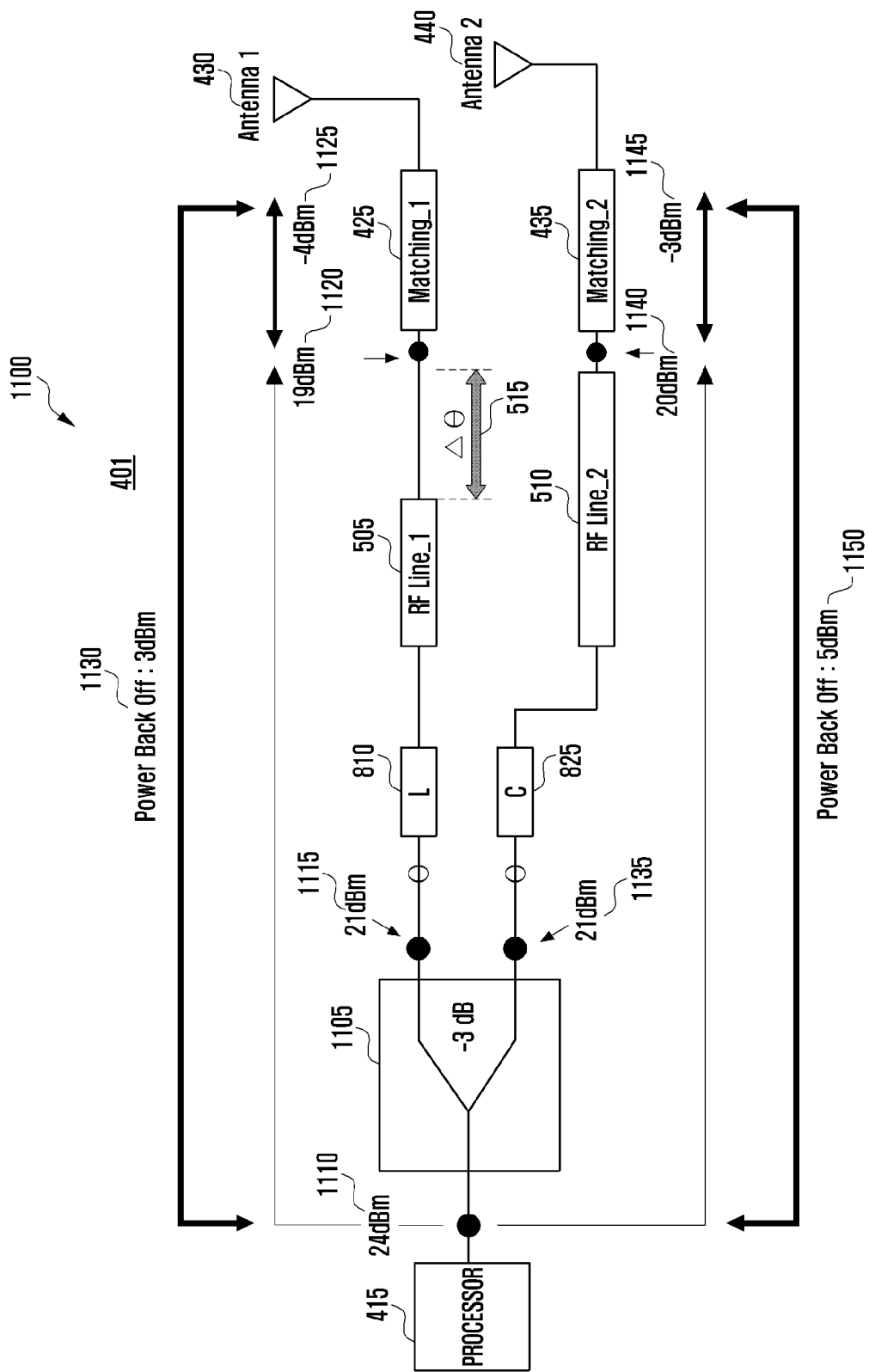
FIG. 11 is a diagram illustrating a method for applying a power back-off to a first antenna and a second antenna, according to an embodiment of the disclosure.

FIG. 11 is a diagram illustrating a method for applying a power back-off to a first antenna and a second antenna, according to an embodiment of the disclosure.

Referring to FIG. 11, in a diagram 1100, an electronic device (e.g., the electronic device 401 of FIG. 4) may include the processor 415, the inductor L 810, the capacitor C 825, the first matching circuit 425, the first antenna 430 (e.g., a Drx antenna), the second matching circuit 435, and/or the second antenna 440 (e.g., a Prx antenna).

Referring to FIG. 5, the processor 415 and the first antenna 430 may be connected by a first signal line (e.g., the first signal line 505 of FIG. 5). The processor 415 and the second antenna 440 may be connected by a second signal line (e.g., the second signal line 510 of FIG. 5).

In various embodiments, the first signal line 505 and the second signal line 510 between the processor 415 and the first antenna 430 and the second antenna 440 are configured differently, so that a performance imbalance between the first antenna 430 and the second antenna 440 based on a conduction loss and radiation difference of the first antenna 430 and the second antenna 440 may be identified. When a performance imbalance between the first antenna 430 and the second antenna 440 is identified, the electronic device 401 may apply different power back-offs to the first antenna 430 and the second antenna 440.

In various embodiments, specified power supplied through a power divider 1105 may be reduced to a predetermined magnitude while being supplied to the first antenna 430 through the inductor L 810 and the first matching circuit 425 through the first signal line 505. For example, assuming that the specified power is power 1110 of 24 dBm, the power 1110 of 24 dBm supplied through the power divider 1105 may be supplied to the inductor L 810 as power 1115 of 21 dBm obtained by reducing the power of 24 dBm by 3 dBm. Power 1115 of 21 dBm supplied through the inductor L 810 may be reduced by 2 dBm while being transmitted through the first signal line 505, and may be supplied to the first matching circuit 425 as power 1120 of 19 dBm. The power 1120 of 19 dBm may be reduced by 4 dBm 1125 while being transmitted through the first matching circuit 425, and finally, power of 15 dBm may be supplied to the first antenna 430.

In various embodiments, specified power supplied through the power divider 1105 may be reduced to a predetermined magnitude while being supplied to the second antenna 440 through the capacitor 825 and the second matching circuit 435 through the second signal line 510. For example, the power 1110 of 24 dBm supplied through the power divider 1105 may be supplied to the capacitor 825 as power 1135 of 21 dBm obtained by reducing the power of 24 dBm by 3 dBm. The power 1135 of 21 dBm supplied through the capacitor 825 may be reduced by 1 dBm while being transmitted through the second signal line 510, and may be supplied to the second matching circuit 435 as power 1140 of 20 dBm. The power 1140 of 20 dBm may be reduced by 3 dBm 1145 while being transmitted through the second matching circuit 435, and finally, power of 17 dBm may be supplied to the second antenna 440.

In various embodiments, the power finally supplied to the first antenna 430 and the second antenna 440 may be different as 15 dBm and 17 dBm, respectively. As the power supplied to each of the first antenna 430 and the second antenna 440 is different, a performance difference (e.g., a performance imbalance) between the first antenna 430 and the second antenna 440 may occur.

In various embodiments, the electronic device 401 may apply different power back-offs to the first antenna 430 and the second antenna 440. For example, the electronic device 401 may apply a power back-off 1130 of 3 dBm to the first antenna 430 and apply a power back-off 1150 of 5 dBm to the second antenna 440, so that the power supplied to the first antenna 430 and the second antenna 440 becomes the same. As the power supplied to the first antenna 430 and the second antenna 440 becomes the same, a performance imbalance which may occur between the first antenna 430 and the second antenna 440 can be prevented, and thus, power degradation can also be improved.

Figure 12:
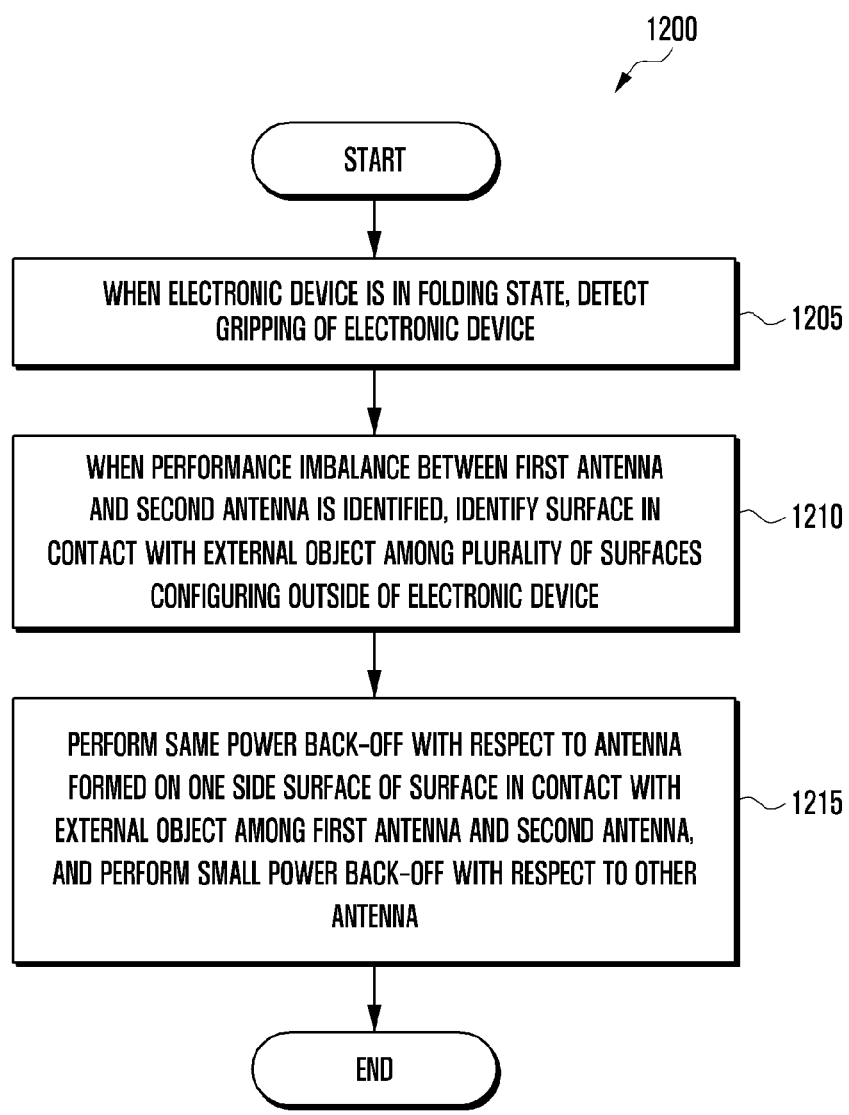
FIGS. 12 and 13 are diagrams illustrating a method for applying different power back-offs to a first antenna and a second antenna according to gripping of an electronic device, according to various embodiments of the disclosure.
Figure 13:
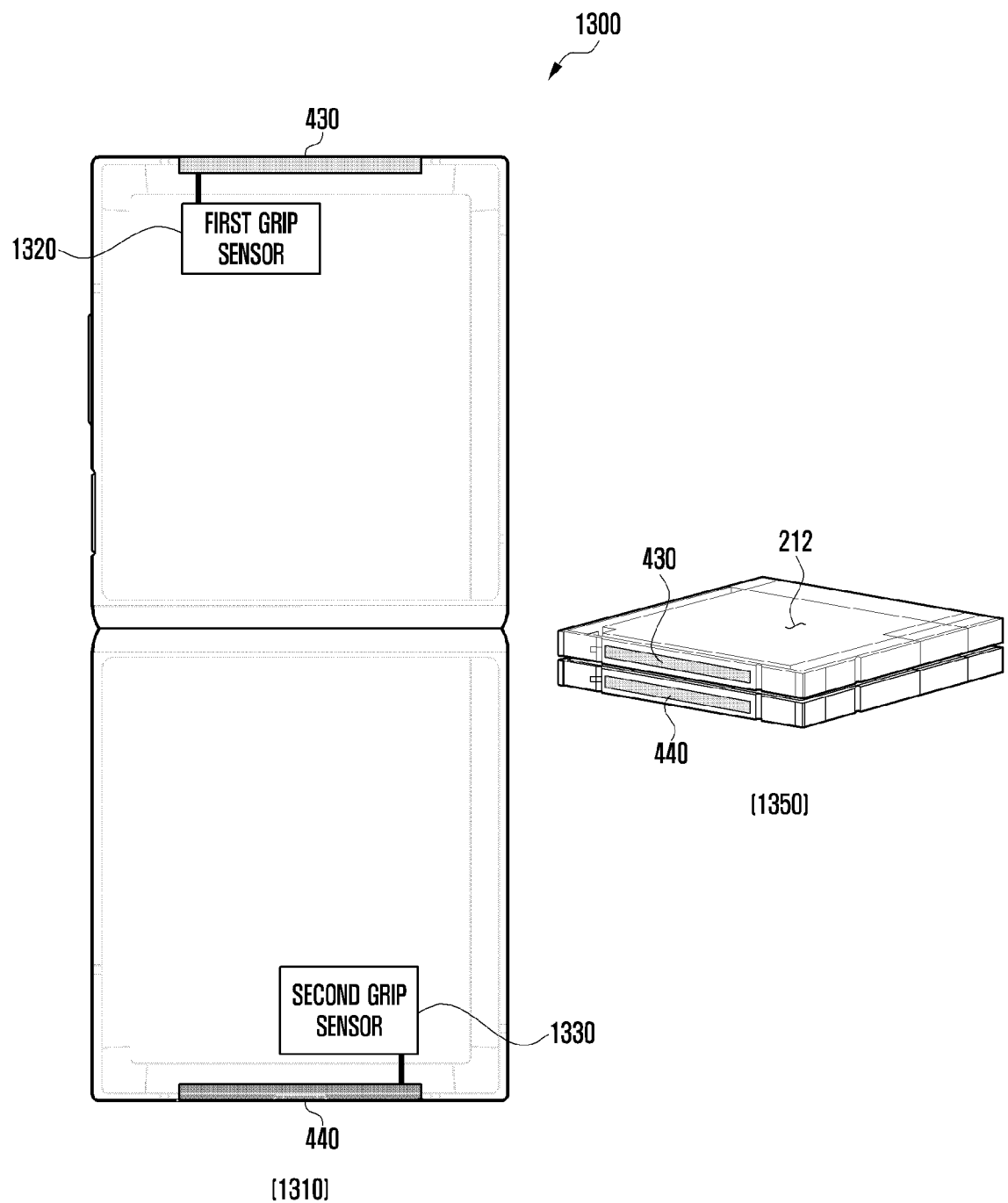

FIGS. 12 and 13 are diagrams illustrating a method for applying different power back-offs to a first antenna and a second antenna according to gripping of the electronic device 401, according to various embodiments of the disclosure.

FIGS. 12 and 13 according to various embodiments may illustrate additional operations of FIG. 11 described above.

Referring to FIGS. 12 and 13, in a method 1200, in operation 1205, a processor (e.g., the processor 415 of the electronic device 401 of FIG. 4) may detect gripping of the electronic device 401 when the electronic device 401 is in a folding state (e.g., the state of FIG. 3A). For example, the electronic device 401 may be gripped by an external object, for example, a user's hand. The processor 415 may detect a folding state of the electronic device 401 and whether the electronic device 401 is gripped, by using a sensor circuit (e.g., the sensor circuit 405 of FIG. 5).

In various embodiments, a folding state of the electronic device 401 may refer to a state of being operated in a manner in which a first surface (e.g., the first surface 211 of FIG. 2A) of a first housing (e.g., the first housing 210 of FIG. 2A) and a third surface (e.g., the third surface 221 of FIG. 2A) of a second housing (e.g., the second housing 220 of FIG. 2A) face each other, and a second surface (e.g., the second surface 212 of FIG. 2C) of the first housing 210 and a fourth surface (e.g., the fourth surface 222 of FIG. 2C) of the second housing 220 face in opposite directions (e.g., a manner in which the second surface 212 of the first housing 210 may face in a first direction (e.g., the z-axis direction of FIG. 3A) and the fourth surface 222 of the second housing 220 faces in a second direction (e.g., the -z-axis direction of FIG. 3A)).

In various embodiments, the sensor circuit 405 may include at least one grip sensor. For example, as shown in panel 1310 of a diagram 1300 of FIG. 13, the electronic device 401 may include a first grip sensor 1320 electrically connected to the first antenna 430 and a second grip sensor 1330 electrically connected to the second antenna 440. The processor 415 may obtain information related to a contact with respect to the electronic device 401 through the first grip sensor 1320 and the second grip sensor 1330. The processor 415 may detect whether the electronic device 401 is gripped, based on the information related to the contact with respect to the electronic device 401 obtained through the first grip sensor 1320 and the second grip sensor 1330.

In an embodiment, in operation 1210, when a performance imbalance between the first antenna 430 and the second antenna 440 is identified, the processor 415 may identify a surface in contact with an external object among a plurality of surfaces configuring the outside of the electronic device 401.

As described above, the plurality of surfaces configuring the outside of the electronic device 401 may include the second surface 212 of the first housing 210 and the fourth surface 222 of the second housing 220.

In an embodiment, as shown in panel 1350 of FIG. 13, the processor 415 may detect whether, among the plurality of surfaces (e.g., the second surface 212 and the fourth surface 222) configuring the outside of the electronic device 401, the second surface 212 of the first housing 210 is in contact with (or gripped by) a user's palm (e.g., the second surface 212 is disposed to face the user's palm), or the fourth surface 222 of the second housing 220 is in contact with (or gripped by) the user's palm (e.g., the fourth surface 222 is disposed to face the user's palm), through the first grip sensor 1320 and the second grip sensor 1330.

In various embodiments, in a folding state of the electronic device 401, a state in which the second surface 212 of the first housing 210 is in contact with (or gripped by) a user's palm may be a state in which a difference between sensor values obtained through the first grip sensor 1320 electrically connected to the first antenna 430 is greater than a difference between sensor values obtained through the second grip sensor 1330 electrically connected to the second antenna 440. For another example, in the folding state of the electronic device 401, a state in which the fourth surface 222 of the second housing 220 is in contact with and gripped by the user's palm may be a state in which a difference between sensor values obtained through the second grip sensor 1330 electrically connected to the second antenna 440 is greater than a difference between sensor values obtained through the first grip sensor 1320 electrically connected to the first antenna 430.

In various embodiments, in a folding state of the electronic device 401, the processor 415 may determine whether the second surface 212 of the first housing 210 is in contact with (or gripped by) a user's palm, or whether the fourth surface 222 of the second housing 220 is in contact with (or gripped by) the user's palm, so as to perform a power back-off of the first antenna 430 and/or the second antenna 440 in operation 1215 to be described later.

In an embodiment, in operation 1215, the processor 415 may perform the same power back-off with respect to an antenna formed on one side surface (e.g., the first side surface 213a of the first housing 210 or the fourth side surface 223a of the second housing 220) of a surface in contact with an external object among the first antenna 430 and the second antenna 440, and perform a small power back-off with respect to the other antenna. For example, as shown in FIG. 11, when the power back-off 1130 of 3 dBm is applied to the first antenna 430 and the power back-off 1150 of 5 dBm is applied to the second antenna 440 such that the power supplied to the first antenna 430 and the second antenna 440 is the same, the processor 415 may perform the same power back-off with respect to an antenna formed on one side surface of a surface in contact with an external object among the first antenna 430 and the second antenna 440, and perform a small power back-off with respect to the other antenna.

For example, when it is identified that the second surface 212 of the electronic device 401 is in contact with (or gripped by) a user's palm, the processor 415 may perform, with respect to the first antenna 430, the same power back-off, for example, the power back-off 1130 of 3 dBm, and perform, with respect to the second antenna 440, a small power back-off, for example, a power (e.g., 4 dBm) back-off which is smaller than the power back-off 1150 of 5 dBm. For another example, when it is identified that the fourth surface 222 of the electronic device 401 is in contact with (or gripped by) the user's palm, the processor 415 may perform, with respect to the first antenna 430, a power (e.g., 2 dBm) back-off which is smaller than the power back-off 1130 of 3 dBm, and perform, with respect to the second antenna 440, the same power back-off, for example, the power back-off 1150 of 5 dBm.

Referring to FIGS. 12 and 13, the electronic device 401 may prevent power from being reduced as different power back-offs are applied to the first antenna 430 and the second antenna 440, in consideration of a gripping state of the electronic device 401 as well as a performance imbalance between the first antenna 430 and the second antenna 440.

In various embodiments, an electronic device (e.g., the electronic device 401 of FIG. 4) may include a hinge module (e.g., the hinge mechanism 240 of FIG. 2B), a first housing (e.g., the first housing 210 of FIG. 2A) at least partially coupled to a first side of the hinge mechanism 240 and including a first antenna (e.g., the first antenna 430 of FIG. 4), a second housing (e.g., the second housing 220 of FIG. 2A) at least partially coupled to a second side of the hinge mechanism 240, configured to be foldable and unfoldable with the first housing 210 by using the hinge mechanism 240, and including a second antenna (e.g., the second antenna 440 of FIG. 4), a sensor circuit (e.g., the sensor circuit 405 of FIG. 4) configured to detect an unfolding state and/or a folding state of the first housing 210 and the second housing 220, a processor (e.g., the processor 415 of FIG. 4) operatively connected to the first antenna 430, the second antenna 440, and the sensor circuit 405, a first signal line (e.g., the first signal line 505 of FIG. 5) configured to connect the processor 415 and the first antenna 430, a tuner circuit (e.g., the tuner circuit 445 of FIG. 4) disposed on the first signal line 505, and a second signal line (e.g., the second signal line 510 of FIG. 5) configured to connect the processor 415 and the second antenna 440, wherein the processor 415 is configured to, when the first housing 210 and the second housing 220 are detected to be in the folding state by using the sensor circuit 405, receive feedback of a signal transmitted to the second antenna 440, detect a phase of the feedback signal, and determine a time constant of the tuner circuit 445 disposed on the first signal line 505, based on the detected phase of the signal.

In various embodiments, the electronic device 401 may include a phase shifter (e.g., the phase shifter 701 of FIG. 7) disposed between the processor 415 and the first antenna 430 and the second antenna 440, instead of the tuner circuit 445.

In various embodiments, the electronic device 401 may further include a memory (e.g., the memory 410 of FIG. 4) and a divider (e.g., the divider 503 of FIG. 7), wherein the processor 415 is configured to, when the phase shifter 701 is disposed between the processor 415 and the first antenna 430 and the second antenna 440, instead of the tuner circuit 445, change the phase to a control value of the phase shifter 701 stored in the memory 410, so as to control a phase of a first signal distributed by the divider 503 and transmitted to the first antenna 430 and a phase of a second signal transmitted to the second antenna 440.

In various embodiments, when the first housing 210 and the second housing 220 are detected to be in the folding state by using the sensor circuit 405, the processor 415 may identify an antenna having low performance among the first antenna 430 and the second antenna 440, and determine whether a transmitting critical situation is identified, based on an electric field condition, and if the transmitting critical situation is identified, apply a transmission weight to the antenna having low performance among the first antenna 430 and the second antenna 440, so as to control the antenna having low performance to operate with an impedance dominant for transmission, and control the antenna other than the antenna having low performance to operate with an impedance dominant for reception.

In various embodiments, when the transmitting critical situation is not identified, the processor 415 may determine whether a receiving critical situation is identified, based on the electric field condition, and if the receiving critical situation is identified, apply a reception weight to the antenna having low performance among the first antenna 430 and the second antenna 440, so as to control the antenna having low performance to operate with the impedance dominant for reception, and control the antenna other than the antenna having low performance to operate with the impedance dominant for transmission.

In various embodiments, if a transmitting and receiving critical situation is identified, based on the electric field condition, the processor 415 may apply the reception weight to the antenna having low performance among the first antenna 430 and the second antenna 440, so as to control the antenna having low performance to operate with the impedance dominant for reception, and control the antenna other than the antenna having low performance to operate with the impedance dominant for transmission.

In various embodiments, the electric field condition may include automatic gain control (AGC) and/or signal to noise ratio (SNR).

In various embodiments, the electronic device 401 may further include a power divider (e.g., the power divider 1105 of FIG. 11) configured to distribute power to each of the first antenna 430 and the second antenna 440, wherein the processor 415 is configured to, when the first housing 210 and the second housing 220 are detected to be in the folding state by using the sensor circuit 405, identify power supplied to each of the first antenna 430 and the second antenna 440 through the power divider 1105, when the power supplied to each of the first antenna 430 and the second antenna 440 through the power divider 1105 is different, identify that a performance imbalance between the first antenna 430 and the second antenna 440 has occurred, and perform a first power back-off with respect to the first antenna 430 and perform, with respect to the second antenna 440, a second power back-off different from the first power back-off.

In various embodiments, the sensor circuit 405 may include a first grip sensor (e.g., the first grip sensor 1320 of FIG. 13) electrically connected to the first antenna 430, and a second grip sensor (e.g., the second grip sensor 1330 of FIG. 13) electrically connected to the second antenna 440.

In various embodiments, the processor 415 may be configured to detect a contact of an external object with respect to the electronic device 401 through the first grip sensor 1320 and the second grip sensor 1330.

In various embodiments, the processor 415 may be configured to detect the contact of the external object with respect to the electronic device 401, identify a surface in contact with the external object among a plurality of surfaces configuring an outside of the electronic device 401, based on the performance imbalance between the first antenna 430 and the second antenna 440 being identified to have occurred, and perform the first power back-off with respect to an antenna formed on one side surface of the surface in contact with the external object among the first antenna 430 and the second antenna 440, and perform, with respect to the other antenna, a third power back-off smaller than the second power back-off.

In various embodiments, an operating method of an electronic device 401 including an antenna may include, when a first housing 210 and a second housing 220 of the electronic device 401 are detected to be in a folding state by using a sensor circuit 405, receiving feedback of a phase of a signal transmitted to a second antenna 440, detecting the feedback phase of the signal, and determining a time constant of a tuner circuit 445 disposed on a first signal line 505 connecting a first antenna 430 and the processor 415 of the electronic device 401, based on the detected phase of the signal.

In various embodiments, the operating method of the electronic device 401 including the antenna may further include, when a phase shifter 701 is disposed between the processor 415 and the first antenna 430 and the second antenna 440, instead of the tuner circuit 445, changing the phase to a control value of the phase shifter 701 stored in a memory 410 of the electronic device 401, so as to control a phase of a first signal distributed by a divider 503 and transmitted to the first antenna 430 and a phase of a second signal transmitted to the second antenna 440.

In various embodiments, the operating method of the electronic device 401 including the antenna may further include, when the first housing 210 and the second housing 220 are detected to be in the folding state by using the sensor circuit 405, identifying an antenna having low performance among the first antenna 430 and the second antenna 440, determining whether a transmitting critical situation is identified, based on an electric field condition, and if the transmitting critical situation is identified, applying a transmission weight to the antenna having low performance among the first antenna 430 and the second antenna 440, so as to control the antenna having low performance to operate with an impedance dominant for transmission, and control the antenna other than the antenna having low performance to operate with an impedance dominant for reception.

In various embodiments, the operating method of the electronic device 401 including the antenna may further include, when the transmitting critical situation is not identified, determining whether a receiving critical situation is identified, based on the electric field condition, and if the receiving critical situation is identified, applying a reception weight to the antenna having low performance among the first antenna 430 and the second antenna 440, so as to control the antenna having low performance to operate with the impedance dominant for reception, and control the antenna other than the antenna having low performance to operate with the impedance dominant for transmission.

In various embodiments, the operating method of the electronic device 401 including the antenna may further include, if a transmitting and receiving critical situation is identified, based on the electric field condition, applying a reception weight to the antenna having low performance among the first antenna 430 and the second antenna 440, so as to control the antenna having low performance to operate with the impedance dominant for reception, and control the antenna other than the antenna having low performance to operate with the impedance dominant for transmission.

In various embodiments, the electric field condition may include automatic gain control (AGC) and/or signal to noise ratio (SNR).

In various embodiments, the operating method of the electronic device 401 including the antenna may further include, when the first housing 210 and the second housing 220 are detected to be in the folding state by using the sensor circuit 405, identifying power supplied to each of the first antenna 430 and the second antenna 440 through a power divider 1105, when the power supplied to each of the first antenna 430 and the second antenna 440 through the power divider 1105 is different, identifying that a performance imbalance between the first antenna 430 and the second antenna 440 has occurred, and performing a first power back-off with respect to the first antenna 430 and performing, with respect to the second antenna 440, a second power back-off different from the first power back-off.

In various embodiments, the operating method of the electronic device 401 including the antenna may further include detecting a contact of an external object with respect to the electronic device 401 through a first grip sensor 1320 electrically connected to the first antenna 430 and a second grip sensor 1330 electrically connected to the second antenna 440.

In various embodiments, the operating method of the electronic device 401 including the antenna may further include, after detecting the contact of the external object with respect to the electronic device 401, identifying a surface in contact with the external object among a plurality of surfaces configuring an outside of the electronic device 401, based on the performance imbalance between the first antenna 430 and the second antenna 440 being identified to have occurred, and performing the first power back-off with respect to an antenna formed on one side surface of the surface in contact with the external object among the first antenna 430 and the second antenna 440, and performing, with respect to the other antenna, a third power back-off smaller than the second power back-off.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a hinge module;
   a first housing at least partially coupled to a first side of the hinge module and comprising a first antenna;
   a second housing at least partially coupled to a second side of the hinge module, the second housing configured to be foldable and unfoldable with the first housing by using the hinge module, and comprising a second antenna;
   a sensor circuit configured to detect at least one of an unfolding state or a folding state of the first housing and the second housing;

a memory;
a processor operatively connected to the first antenna, the second antenna, the sensor circuit, and the memory;
a first signal line configured to connect the processor and the first antenna;
a tuner circuit;
a second signal line configured to connect the processor and the second antenna;
a third signal line; and
a divider,
wherein the processor is configured to:
  transmit a signal to the second antenna through the second signal line,
  based on the detection of the folding state using the sensor circuit, receive the signal transmitted to the second antenna as a feedback signal through the third signal line,
  detect a phase of the feedback signal,
  determine a time constant of the tuner circuit disposed on the first signal line, based on the detected phase of the feedback signal,
  adjust a phase of the first antenna based on the determined time constant of the tuner circuit,
  in case that the tuner circuit comprises a phase shifter disposed between the processor and the first antenna and the second antenna, wherein the processor is configured to change, based on a control value of the phase shifter stored in the memory, a phase of a first signal and transmitted to the first antenna and a phase of a second signal transmitted to the second antenna distributed by the divider.

2. The electronic device of claim 1, wherein the processor is further configured to:
  based on the detection of the folding state using the sensor circuit, identify an antenna having a low performance among the first antenna and the second antenna;
  determine whether a transmitting critical situation is identified, based on an electric field condition; and
  in case that the transmitting critical situation is identified, apply a transmission weight to the antenna having low performance among the first antenna and the second antenna to control the antenna having low performance to operate with an impedance dominant for transmission, and control the antenna other than the antenna having low performance to operate with an impedance dominant for reception.

3. The electronic device of claim 2, wherein the processor is further configured to:
  in case that the transmitting critical situation is not identified, determine whether a receiving critical situation is identified, based on the electric field condition; and
  in case that the receiving critical situation is identified, apply a reception weight to the antenna having low performance among the first antenna and the second antenna to control the antenna having low performance to operate with the impedance dominant for reception, and control the antenna other than the antenna having low performance to operate with the impedance dominant for transmission.

4. The electronic device of claim 3, wherein the processor is further configured to:
  in case that a transmitting and receiving critical situation is identified, based on the electric field condition, apply the reception weight to the antenna having low performance among the first antenna and the second antenna to control the antenna having low performance to operate with the impedance dominant for reception, and control the antenna other than the antenna having low performance to operate with the impedance dominant for transmission.

5. The electronic device of claim 2, wherein the electric field condition comprises at least one of automatic gain control (AGC) or signal to noise ratio (SNR).

6. The electronic device of claim 1, further comprising:
  a power divider configured to distribute power to each of the first antenna and the second antenna,
  wherein the processor is further configured to:
    based on the detection of the folding state using the sensor circuit, identify power supplied to each of the first antenna and the second antenna through the power divider,
    in case that the power supplied to each of the first antenna and the second antenna through the power divider is different, identify that a performance imbalance between the first antenna and the second antenna has occurred, and
    perform a first power back-off with respect to the first antenna and perform, with respect to the second antenna, a second power back-off different from the first power back-off.

7. The electronic device of claim 6, wherein the sensor circuit comprises:
  a first grip sensor electrically connected to the first antenna; and
  a second grip sensor electrically connected to the second antenna.

8. The electronic device of claim 7, wherein the processor is further configured to detect a contact of an external object with respect to the electronic device through the first grip sensor and the second grip sensor.

9. The electronic device of claim 8, wherein the processor is further configured to:
  detect the contact of the external object with respect to the electronic device;
  identify a surface in contact with the external object among a plurality of surfaces configuring an outside of the electronic device, based on the performance imbalance between the first antenna and the second antenna being identified to have occurred;
  perform the first power back-off with respect to an antenna formed on one side surface of the surface in contact with the external object among the first antenna and the second antenna; and
  perform, with respect to another antenna, a third power back-off smaller than the second power back-off.

10. A method of operating an electronic device comprising a hinge module; a first housing at least partially coupled to a first side of the hinge module and comprising a first antenna; a second housing at least partially coupled to a second side of the hinge module, the second housing configured to be foldable and unfoldable with the first housing by using the hinge module, and comprising a second antenna; a sensor circuit configured to detect at least one of an unfolding state or a folding state of the first housing and the second housing; a memory; a processor operatively connected to the first antenna, the second antenna, the sensor circuit, and the memory; a first signal line configured to connect the processor and the first antenna; a tuner circuit; a second signal line configured to connect the processor and the second antenna; a third signal line; and a divider, the method comprising:

transmitting a signal to the second antenna through the second signal line;
based on the detection of the folding state using a sensor circuit, receiving the signal transmitted to the second antenna as a feedback signal through the third signal line;
detecting a phase of the feedback signal;
determining a time constant of the tuner circuit disposed on a first signal line based on the detected phase of the feedback signal; and
adjusting a phase of the first antenna based on the determined time constant of the tuner circuit,
wherein the tuner circuit is configured with a phase shifter disposed between the processor and the first antenna and the second antenna, and
wherein the method further comprises changing, based on a control value of the phase shifter stored in the memory, a phase of a first signal and transmitted to the first antenna and a phase of a second signal transmitted to the second antenna distributed by the divider.

11. The method of claim 10, further comprising:
based on the detection of the folding state using the sensor circuit, identifying an antenna having low performance among the first antenna and the second antenna;
determining whether a transmitting critical situation is identified, based on an electric field condition; and
based on the determining of the transmitting critical situation being identified, applying a transmission weight to the antenna having low performance among the first antenna and the second antenna to control the antenna having low performance to operate with an impedance dominant for transmission, and control the antenna other than the antenna having low performance to operate with an impedance dominant for reception.

12. The method of claim 11, further comprising:
based on the determining of the transmitting critical situation not being identified, determining whether a receiving critical situation is identified, based on the electric field condition; and
based on the receiving critical situation being identified, applying a reception weight to the antenna having a low performance among the first antenna and the second antenna to control the antenna having low performance to operate with the impedance dominant for reception, and control the antenna other than the antenna having low performance to operate with the impedance dominant for transmission.

13. The method of claim 12, further comprising:
based on a transmitting and receiving critical situation being identified, based on the electric field condition, applying the reception weight to the antenna having low performance among the first antenna and the second antenna to control the antenna having low performance to operate with the impedance dominant for reception, and control the antenna other than the antenna having low performance to operate with the impedance dominant for transmission.

14. The method of claim 11, wherein the electric field condition comprises at least one of automatic gain control (AGC) or signal to noise ratio (SNR).

15. The method of claim 10, further comprising:
based on the detection of the folding state using the sensor circuit, identifying power supplied to each of the first antenna and the second antenna through a power divider;
based on the power supplied to each of the first antenna and the second antenna through the power divider being different, identifying that a performance imbalance between the first antenna and the second antenna has occurred; and
performing a first power back-off with respect to the first antenna and performing, with respect to the second antenna, a second power back-off different from the first power back-off.

16. The method of claim 15, further comprising:
detecting a contact of an external object with respect to the electronic device through a first grip sensor electrically connected to the first antenna, and a second grip sensor electrically connected to the second antenna.

17. The method of claim 16, further comprising:
after detecting the contact of the external object with respect to the electronic device, identifying a surface in contact with the external object among a plurality of surfaces configuring an outside of the electronic device, based on the performance imbalance between the first antenna and the second antenna being identified to have occurred;
performing the first power back-off with respect to an antenna formed on one side surface of the surface in contact with the external object among the first antenna and the second antenna; and
performing, with respect to another antenna, a third power back-off smaller than the second power back-off.

* * * * *